(12) United States Patent
Ito et al.

(10) Patent No.: US 8,877,664 B2
(45) Date of Patent: Nov. 4, 2014

(54) ZIRCONIA SINTERED BODY, AND MIXTURE, PRE-SINTERED COMPACT AND PRE-SINTERED CALCINED BODY FOR SINTERING ZIRCONIA SINTERED BODY

(75) Inventors: Yoshihisa Ito, Aichi (JP); Yoshihisa Yamada, Aichi (JP); Hiroshi Inada, Aichi (JP); Kiyoko Ban, Aichi (JP)

(73) Assignee: Noritake Co., Limited, Nagoya-Shi, Aichi (JP)

( * ) Notice: Subject to any disclaimer, the term of this patent is extended or adjusted under 35 U.S.C. 154(b) by 175 days.

(21) Appl. No.: 13/391,028

(22) PCT Filed: Aug. 20, 2010

(86) PCT No.: PCT/JP2010/064111
§ 371 (c)(1),
(2), (4) Date: May 3, 2012

(87) PCT Pub. No.: WO2011/021698
PCT Pub. Date: Feb. 24, 2011

(65) Prior Publication Data
US 2012/0214661 A1  Aug. 23, 2012

(30) Foreign Application Priority Data
Aug. 21, 2009 (JP) ................................. 2009-192287

(51) Int. Cl.
C04B 35/48 (2006.01)
C04B 35/49 (2006.01)
C04B 35/645 (2006.01)
C04B 35/486 (2006.01)
C04B 35/632 (2006.01)

(52) U.S. Cl.
CPC ....... *C04B 35/486* (2013.01); *C04B 2235/9684* (2013.01); *C04B 2235/96* (2013.01); *C04B 2235/3294* (2013.01); *C04B 2235/72* (2013.01); *C04B 2235/727* (2013.01); *C04B 2235/3418* (2013.01); *C04B 35/6455* (2013.01);

(Continued)

(58) Field of Classification Search
USPC .................................. 501/102, 103, 104, 105
See application file for complete search history.

(56) References Cited

U.S. PATENT DOCUMENTS 4,525,464 A   6/1985  Claussen et al.
5,023,218 A * 6/1991  Zanoli et al. .................. 501/105
(Continued)

FOREIGN PATENT DOCUMENTS

CN   1103283 A    6/1995
EP   0 631 995 A1  1/1995
(Continued)

OTHER PUBLICATIONS

Written Opinion (PCT/ISA/237) issued on Nov. 3, 2010, by the Japanese Patent Office as the International Searching Authority for International Application No. PCT/JP2010/064111 (English translation—10 pages).

(Continued)

*Primary Examiner* — Noah Wiese
(74) *Attorney, Agent, or Firm* — Buchanan, Ingersoll & Rooney PC

(57) ABSTRACT

Provided is a high-strength zirconia sintered body in which the progression of low-temperature degradation is inhibited. The zirconia sintered body contains partially-stabilized zirconia as a matrix phase and contains at least one element from among phosphorus (P), arsenic (As), antimony (Sb), and bismuth (Bi). The content of the abovementioned element(s) in the zirconia sintered body ranges from $4\times10^{-4}$ mol to $4\times10^{-2}$ mol with respect to 1 mol of zirconium(IV) oxide. Preferably, the zirconia sintered body further contains 0.03% to 3% by mass of silicon dioxide.

20 Claims, 21 Drawing Sheets

(52) U.S. Cl.
CPC .......... C04B 2235/3225 (2013.01); C04B 2235/6567 (2013.01); C04B 2235/447 (2013.01); C04B 2235/32 (2013.01); C04B 2235/3298 (2013.01); C04B 2235/3208 (2013.01); C04B 35/632 (2013.01); C04B 2235/765 (2013.01); C04B 2235/76 (2013.01); C04B 2235/656 (2013.01); C04B 2235/3206 (2013.01); C04B 2235/3217 (2013.01); C04B 2235/42 (2013.01)
USPC .......................................... 501/103; 501/102

(56) References Cited

U.S. PATENT DOCUMENTS

| | | | |
|---|---|---|---|
| 5,306,673 | A | 4/1994 | Hermansson et al. |
| 5,827,572 | A | 10/1998 | Song et al. |
| 5,849,068 | A | 12/1998 | Hofmann et al. |
| 5,916,498 | A | 6/1999 | Hofmann et al. |
| 6,121,177 | A * | 9/2000 | Guigonis et al. ............... 501/105 |
| 6,126,732 | A | 10/2000 | Hofmann et al. |
| 7,871,950 | B2 | 1/2011 | Nakasuga et al. |
| 2010/0240519 | A1 | 9/2010 | Nakasuga et al. |
| 2012/0214661 | A1 | 8/2012 | Ito et al. |
| 2013/0190164 | A1 | 7/2013 | Ito et al. |

FOREIGN PATENT DOCUMENTS

| | | |
|---|---|---|
| JP | 60-108366 A | 6/1985 |
| JP | 01-115360 A | 5/1989 |
| JP | 02-255570 A | 10/1990 |
| JP | 3-115166 A | 5/1991 |
| JP | 03-237059 A | 10/1991 |
| JP | 04-504403 A | 8/1992 |
| JP | 06-092728 A | 4/1994 |
| JP | 06-239662 A | 8/1994 |
| JP | 07-215758 A | 8/1995 |
| JP | 08-033701 A | 2/1996 |
| JP | 09-194257 A | 7/1997 |
| JP | 09-227228 A | 9/1997 |
| JP | 2001-80962 A | 3/2001 |
| JP | 2003-323903 A | 11/2003 |
| JP | 2004-075532 A | 3/2004 |
| JP | 2006-315912 A | 11/2006 |
| JP | 2007-332026 A | 12/2007 |
| JP | 2009-23850 A | 2/2009 |
| WO | WO 2007/108416 A1 | 9/2007 |
| WO | WO 2011/021698 A1 | 2/2011 |

OTHER PUBLICATIONS

International Search Report (Form PCT/ISA/210) issued on Nov. 22, 2011, by the Japanese Patent Office as the International Searching Authority for International Application No. PCT/JP2011/068745. (6 pages).

Written Opinion (Form PCT/ISA/237) issued on Nov. 22, 2011, by the Japanese Patent Office as the International Searching Authority for International Application No. PCT/JP2011/068745. (8 pages).

International Report on Patentability (Form PCT/IPEA/409) issued on Dec. 25, 2012, by the Japanese Patent Office as the International Searching Authority for International Application No. PCT/JP2011/068745. (22 pages).

Notification of Transmittal of Translation of the International Preliminary Report on Patentability (Forms PCT/IB/338 and PCT/IPEA/409) issued on Feb. 28, 2013, by the International Bureau of WIPO for International Application No. PCT/JP2011/068745. (7 pages).

Office Action (Notice of the Grounds for Rejection) dated May 21, 2013, issued in Japanese Patent Application No. 2010-044967, and an English Translation of the Office Action. (6 pages).

Office Action (1$^{st}$ Notice of Grounds for Rejection) dated Jun. 4, 2013, issued in corresponding Chinese Patent Application No. 201080037193.8, and an English Translation of the Office Action, (10 pages).

International Search Report (PCT/ISA/210) issued on Nov. 30, 2010, by Japanese Patent Office as the International Searching Authority for International Application No. PCT/JP2010/06411.

Written Opinion (PCT/ISA/237) issued on Nov. 15, 2010, by Japanese Patent Office as the International Searching Authority for International Application No. PCT/JP2010/06411.

I.C. Cosentino et al., The effect of bismuth oxide addition on the electrical properties of zirconia-magnesia magnesia solid electrolytes, Journal of Materials Science Letters 12, 1993, pp. 1022-1024.

Taiji Yamamoto, Ichiro Kake, Improvement of heat resistance degradation by surface improvement of Y-TZP, Zirconia ceramics 13 and 14, Uchida Rokokuho, 1998, pp. 147-163.

Extended European Search Report dated May 7, 2013, issued by the European Patent Office in the corresponding European Application No. 10810039.7. (6 pages).

* cited by examiner

ZIRCONIA SINTERED BODY, AND MIXTURE, PRE-SINTERED COMPACT AND PRE-SINTERED CALCINED BODY FOR SINTERING ZIRCONIA SINTERED BODY

REFERENCE TO RELATED APPLICATION

The present invention is based upon and claims the benefit of the priority of Japanese patent application No. 2009-192287, filed on Aug. 21, 2009, the disclosure of which is incorporated herein in its entirety by reference thereto.

The present invention relates to a zirconia sintered body. The present invention also relates to a mixture, pre-sintered compact and pre-sintered calcined body for sintering the zirconia sintered body.

TECHNICAL FIELD

Background Art

In zirconium oxide (IV) ($ZrO_2$) (referred as "zirconia" hereinafter), there are polymorphs, and zirconia is subject to phase transition between the polymorphs. Tetragonal zirconia changes to monoclinic zirconia by the phase transition, for example. Therefore, since the phase transition leads to destruction of the crystal structure even though a sintered body is made of only zirconia, there is a problem that the sintered body of only zirconia does not have enough strength for a product. There is also another problem that a size of the sintered body of only zirconia is changed by volume change caused by the phase transition.

Therefore, stabilized zirconia and partially-stabilized zirconia (PSZ) have been used, in which the phase transition is inhibited by adding oxide, such as calcium oxide, magnesium oxide, yttrium oxide and cerium oxide, as a stabilizing agent to zirconia. In particular, the partially-stabilized zirconia is a ceramic having an outstanding property such as high strength and high toughness, and a sintered body of the partially-stabilized zirconia has been used in various ways such as a prosthetic material for dental treatment, a tool, and the like.

However, a problem of lack of long-term stabilization has not been solved yet because the partially-stabilized zirconia is nothing but partially stabilized body. When the partially-stabilized zirconia is heated to 200 degrees Celsius under the existence of water, for example, the phase transition from the tetragonal system to the monoclinic system occurs, and this degrades the strength of the partially-stabilized zirconia (referred as "low-temperature degradation" hereinafter). Accordingly, an art for manufacturing the zirconia sintered body has been developed to inhibit the low-temperature degradation (see Patent Document 1 and Patent Document 2, for example).

In the background arts according to Patent Document 1 and Patent Document 2, minute powder of the partially-stabilized zirconia having an average particle size of 0.5 μm or less is sintered at a temperature of 1200-1400 degrees Celsius to manufacture the zirconia sintered body.

Patent Document 3 discloses a block for dental processing to manufacture a frame which is easy to be cut or ground after being completely sintered and which has flexural strength applicable to a bridge for multiple teeth loss. The block for the dental processing disclosed in Patent Document 3 is a completely-sintered body of metal oxide having at least one of zirconia, alumina, mullite and spinel as a principle material and includes lanthanum phosphate and/or aluminum phosphate of 1 weight part to 23 weight parts in a crystal form to the metal oxide of 100 weight parts.

In background arts according to Patent Document 4 and Non-Patent Document 1, in order to obtain a zirconia sintered body in which the low-temperature degradation phenomenon does not occur, the zirconia sintered body is manufactured by applying a solution including a compound such as Y to a surface of a unburned compact of a zirconia material including $Y_2O_3$ and the like and then burning it at 1300-1800 degrees Celsius.

BACKGROUND ART DOCUMENTS

Patent Documents

Patent Document 1: JP Patent Kokai Publication No. JP-P2001-80962A
Patent Document 2: JP Patent Kokai Publication No. JP-P2007-332026A
Patent Document 3: JP Patent Kokai Publication No. JP-P2009-23850A
Patent Document 4: JP Patent Kokai Publication No. JP-A-03-115166P
Non-Patent Document 1: Taiji Yamamoto, Ichiro Kakei, "Improvement of heat resistance degradation by surface improvement of Y-TZP", Zirconia ceramics 13 and 14, Uchida Rokakuho, 1998, pp. 147-163

SUMMARY OF THE INVENTION

Problems to be Solved by the Invention

The entire disclosures of the above Patent Documents 1 to 4 and Non-Patent Document 1 are incorporated herein by reference thereto. In the following, analyses are given by the present invention.

A zirconia sintered body including many monoclinic crystals to which the phase transition occurs from the tetragonal crystals and a zirconia sintered body making rapid progress of the phase transition from the tetragonal system to the monoclinic systems can not maintain enough strength to obtain high reliability as industrial products (dental prosthesis, for example) because of risk of breakage.

In the background arts disclosed in Patent Document 1 and Patent Document 2, the zirconia sintered body is obtained by making partially-stabilized zirconia particles extremely minute so as to be sintered easily and sintering the particles at the low temperature of 1200-1400 degrees Celsius. However, in order to enhance the strength and size stability of the zirconia sintered body, the particles are required to be sintered at higher temperature.

If the partially-stabilized zirconia particles are sintered at higher temperature (temperature higher than 1400 degrees Celsius, for example) in order to enhance the strength of the zirconia sintered body, even though the minute partially-stabilized zirconia particles as disclosed in Patent Document 1 and Patent Document 2 are used, the sintered body easily makes progress in the low-temperature degradation. This sintered body has problems in view of maintenance of the strength and life span of the product. Moreover, since the progress of the phase transition changes the size of the sintered body, the sintered body can not be used for the product with high precision.

In the background arts disclosed in Patent Document 1 and Patent Document 2, the limited particle size of the partially-stabilized zirconia particle restricts manufacturing the sintered body, and, in order to confirm the reliability of the sintered body, the size of the material particles have to be measured before making the sintered body.

Although the block for the dental processing disclosed in Patent Document 3 provides the zirconia sintered body easy to be cut and ground, there are the same problems as those of the arts disclosed Patent Document 1 and Patent Document 2 because the manufacturing method of the sintered body is same.

In the background arts disclosed in Patent Document 3 and Non-Patent Document 1, a cubic system is formed near the surface of the zirconia sintered body by applying the solution of the compound including yttria ($Y_2O_3$) or the like to an unburned surface. The cubic system is formed from the burned surface to a region having a depth of 200 μm or more. The particles in the burned surface grow to the crystal particle size of about 0.3 μm to about 2.5 μm. Therefore, the zirconia sintered body having high flexural strength and fracture toughness can not be obtained. In the methods disclosed in Patent Document 3 and Non-Patent Document 1, each time the cubic system is intended to be formed, it is necessary to use the stabilizing agent to be applied to the surface in addition to the stabilizing agent included in the material particles. The manufacturing cost becomes high because the stabilizing agent using the rare-earth element is expensive and the applying work is particularly troublesome.

On the other hand, in the fully-stabilized zirconia, although the phase transition to the monoclinic system can be inhibited, the toughness and strength become lower than those of the partially-stabilized zirconia.

Although colorlessness and semi-transparency besides the strength are necessary for using the zirconia sintered body as the dental prosthesis, some stabilizing agents make coloration and loss of the transparency.

An object of the prevent invention is to provide a zirconia sintered body having high strength and in which progress of the low-temperature degradation is inhibited. An object of the present invention is to provide a mixture, pre-sintered compact and pre-sintered calcined body which are precursors of the zirconia sintered body.

Means to Solve the Problems

According to a first aspect, a zirconia sintered body comprising partially-stabilized zirconia as a matrix phase is provided. The zirconia sintered body includes at least one element of phosphorus (P), arsenic (As), antimony (Sb) and bismuth (Bi). At least one element is included $4 \times 10^{-4}$ mol to $4 \times 10^{-2}$ mol to 1 mol of zirconium oxide (IV).

According to a second aspect, a zirconia sintered body is provided, wherein, when a low-temperature degradation acceleration test is applied to the zirconia sintered body at a temperature of 180 degrees Celsius and a pressure of 1 MPa for 24 hours, in an X-ray diffraction pattern of a surface of the zirconia sintered body after the low-temperature degradation acceleration test, a first peak ratio is 1 or less, the first peak ratio being a ratio of a height of a peak existing near a position where a monoclinic [11-1] peak appears to a height of a peak existing near a position where a tetragonal [111] peak appears.

According to a third aspect, a zirconia sintered body is provided, wherein, when a low-temperature degradation acceleration test is applied to a test piece of the zirconia sintered body having a size of 4 mm×25 mm×0.2 mm at a temperature of 180 degrees Celsius and a pressure of 1 MPa for 24 hours, a flexural strength of the test piece after the low-temperature degradation acceleration test is 50 MPa or more, the flexural strength being measured in conformity with JISR1601 except the size of the test piece.

According to a fourth aspect, a precursor compact for sintering a zirconia sintered body is provided, which comprises partially-stabilized zirconia particles and a compound(s) including at least one element of phosphorus (P), arsenic (As), antimony (Sb) and bismuth (Bi) or a simple substance of at least one element. At least one element is included $4 \times 10^{-4}$ mol to $4 \times 10^{-2}$ mol to 1 mol of zirconium oxide (IV).

According to a fifth aspect, a mixture for sintering a zirconia sintered body is provided, which comprises partially-stabilized zirconia particles and a compound(s) including at least one element of phosphorus (P), arsenic (As), antimony (Sb) and bismuth (Bi) or a simple substance of at least one element. At least one element is included $4 \times 10^{-4}$ mol to $4 \times 10^{-2}$ mol to 1 mol of zirconium oxide (IV).

According to a sixth aspect, a compact as a precursor for sintering a zirconia sintered body is provided, wherein the zirconia sintered body of the present invention is obtained by sintering the compact at a temperature ranging from 1450 degrees Celsius to 1650 degrees Celsius.

According to a seventh aspect, a calcined body as a precursor for sintering a zirconia sintered body is provided, wherein the zirconia sintered body of the present invention is obtained by sintering the calcined body at a temperature ranging from 1450 degrees Celsius to 1650 degrees Celsius.

According to an eighth aspect, a mixture for sintering a zirconia sintered body is provided, wherein the zirconia sintered body of the present invention is obtained by sintering the mixture at a temperature ranging from 1450 degrees Celsius to 1650 degrees Celsius.

The zirconia sintered body of the present invention includes not only a sintered body in which molded zirconia particles are sintered under an ordinary condition (without applying pressure or under atmospheric pressure) but also a sintered body densified by HIP (Hot Isostatic Pressing) treatment.

In the present invention, the term "low-temperature degradation acceleration test" is a test conforming to ISO13356. With the proviso, however, although the condition provided in ISO13356 is "134 degrees Celsius, 0.2 MPa, 5 hours", a corresponding condition in the prevent invention is changed to "180 degrees Celsius, 1 MPa" to make the condition severer, and a test time is suitably determined corresponding to a purpose. Hereinafter, "the low-temperature degradation acceleration test" is also expressed as "a hydrothermal treatment" or "a hydrothermal treatment test".

Effects of the Invention

The present invention has at least one of the following effects.

According to the present invention, a zirconia sintered body in which progress of phase transition is inhibited and therefore which has long stability can be obtained. As a result, the zirconia sintered body of the present invention can be used for a product requiring high reliability and long life span (or durable life). The zirconia sintered body of the present invention can be also used for a product requiring high precision because size change caused by the phase transition is reduced.

According to the present invention, a zirconia sintered body having high strength and high toughness can be obtained because the zirconia sintered body is made by being burned (sintered) at high temperature.

A zirconia sintered body of the present invention has colorlessness and semi-transparency and therefore can be used for a product requiring the transparency such as dental prosthesis.

In the present invention, it is considered that, during the burning, it is thought that a stabilizing agent(s) in raw materials migrates toward a surface. Therefore, only an extremely thin region of the burned (as-sintered) surface has high content of the stabilizing agent(s), and a cubic system increases in this region. On the other hand, the content of the stabilizing agent in the interior of the zirconia sintered body hardly changes because the stabilizing agent(s) concentrates in only the burned surface, and therefore a crystal system in the interior of the zirconia sintered body can maintain a tetragonal system. That is, according to the present invention, a cover of a layer including a large amount of the cubic crystals can be formed only in the burned (as-sintered) surface of the zirconia sintered body. It is considered that the layer including a large amount of the cubic crystals can inhibit the zirconia sintered body from being degraded by the hydrothermal treatment.

The crystal system in the interior of the zirconia sintered body can maintain the tetragonal system, and therefore the flexural strength and fracture toughness do not decrease. A zirconia sintered body in which both of the flexural strength and the fracture toughness, which are generally in inverse proportion (i.e., trade-off relation), are improved can be obtained.

In the present invention, it is unnecessary to apply a separate stabilizing agent on the surface in order to make a large amount of the cubic crystals be included in the burned (as-sintered) surface, and it is merely necessary to burn materials by adding inexpensive additives, as a result which there is no increase of a manufacturing cost.

In the zirconia sintered body of the present invention, even if a surface of the tetragonal system is exposed by processing the burned (as-sintered) surface, by burning it again, the cubic system can be formed near the re-burned surface (exposed surface) again. Accordingly, even if a surface whose main crystal system is tetragonal is exposed by processing the as-sintered body to a desired shape, the sintered body can be covered with the layer including the cubic crystals through the second burning, and a product in which progress of the hydrothermal degradation can be inhibited can be manufactured.

Consequently, according to the present invention, a zirconia sintered body having low low-temperature degradation, high strength and high fracture toughness can be obtained without increasing the manufacturing cost. Moreover, this can be achieved regardless of any shape even in a case of a complex shape.

MODES FOR CARRYING OUT THE INVENTION

Figure 1:
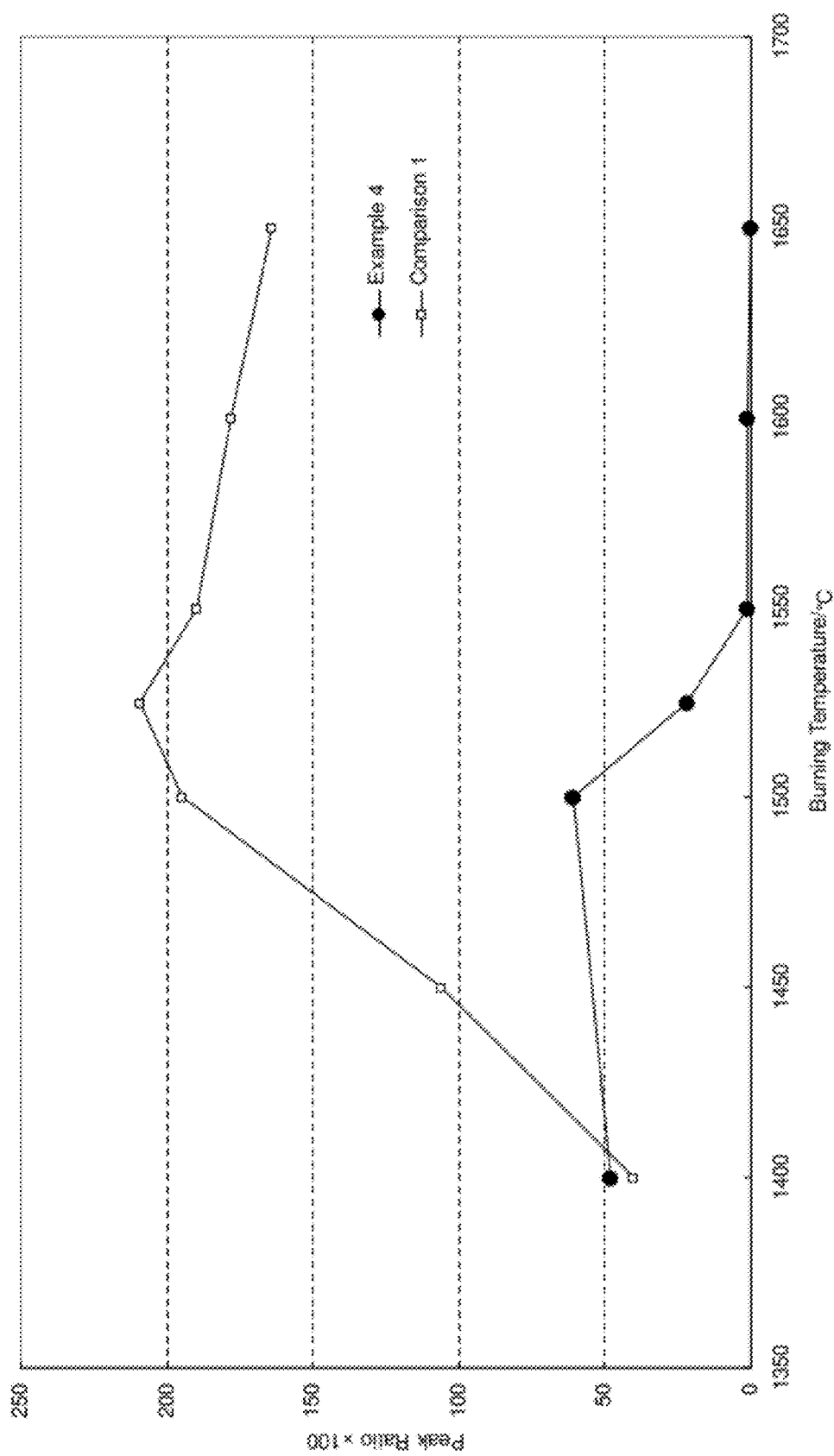
FIG. 1 is a graph to compare Example 4 in Table 13 with Comparison (Comparative Example) 1.

Preferred modes of the zirconia sintered body according to the first to third aspects, the pre-sintered compact for the zirconia sintered body according to the fourth aspect, and the mixture for sintering the zirconia sintered body according to the fifth aspect will be recited below.

According to a preferred mode of the first aspect, the element is phosphorus.

According to a preferred mode of the above first aspect, a content of the phosphorus element is 0.01 mass % to 1 mass %.

According to a preferred mode of the above first aspect, the zirconia sintered body further includes 0.03 mass % to 3 mass % of silicon dioxide.

According to a preferred mode of the above second and third aspects, the zirconia sintered body comprises at least one among the modes of the first aspect.

According to a preferred mode of the above first to third aspects, the zirconia sintered body is sintered at a temperature ranging from 1450 degrees Celsius to 1650 degrees Celsius.

According to a preferred mode of the above first to third aspects, the zirconia sintered body comprises yttrium oxide. A content of yttrium oxide is 2 mol % to 5 mol %.

According to a preferred mode of the above first to third aspects, the zirconia sintered body is used as dental prosthesis.

According to a preferred mode of the above first to third aspects, in an X-ray diffraction pattern of a burned (as-sintered) surface, a second peak ratio is 0.4 or more, the second peak ratio being a ratio of a height of a peak existing near a position where a cubic [200] peak appears to a height of a peak existing near a position where a tetragonal [200] peak appears. In an X-ray diffraction pattern of a region having depth of 100 μm or more from the burned surface, a third peak ratio is 0.3 or less, the third peak ratio being the ratio of the height of the peak existing near the position where the cubic

[200] peak appears to the height of the peak existing near the position where the tetragonal [200] peak appears.

According to a preferred mode of the above first to third aspects, when a burned (as-sintered) surface or exposed surface is ground so that a surface, in which a fourth peak ratio is 0.3 or less, is exposed and then burned again, the fourth peak ratio being a ratio of a height of a peak existing near a position where a cubic [200] peak appears to a height of a peak existing near a position where a tetragonal [200] peak appears, in an X-ray diffraction pattern of a re-burned surface, a fifth peak ratio is 0.4 or more, the fifth peak ratio being the ratio of the height of the peak existing near the position where the cubic [200] peak appears to the height of the peak existing near the position where the tetragonal [200] peak appears.

According to a preferred mode of the above first to third aspects, in an X-ray diffraction pattern of a region having depth of 100 μm or more from the re-burned surface, a sixth peak ratio is 0.3 or less, the sixth peak ratio being the ratio of the height of the peak existing near the position where the cubic [200] peak appears to the height of the peak existing near the position where the tetragonal [200] peak appears.

According to a preferred mode of the fourth aspect, at least one element is included $4 \times 10^{-3}$ mol to $3 \times 10^{-2}$ mol to 1 mol of zirconium oxide (IV).

According to a preferred mode of the above fourth aspect, the element is phosphorus.

According to a preferred mode of the above fourth aspect, the compound(s) is(are) phosphoric acid or phosphate.

According to a preferred mode of the above fourth aspect, the compound(s) is(are) an organic compound including phosphorus.

According to a preferred mode of the above fourth aspect, the compact further comprises 0.03 mass % to 3 mass % of silicon dioxide to the partially-stabilized zirconia particles.

According to a preferred mode of the above fourth aspect, the partially-stabilized zirconia includes yttrium oxide. A content of yttrium oxide in the partially-stabilized zirconia is 2 mol % to 5 mol %.

According to a preferred mode of the above fourth aspect, the compact is used as a material for dental prosthesis.

According to a preferred mode of the above fourth aspect, a calcined body as a precursor for sintering a zirconia sintered body is provided, which is made by calcining the compact at a temperature ranging from 800 degrees Celsius to 1200 degrees Celsius.

According to a preferred mode of the above fifth aspect, the mixture further comprises 0.03 mass % to 3 mass % of silicon dioxide to the partially-stabilized zirconia particles.

A zirconia sintered body of the present invention will be explained. The zirconia sintered body of the present invention is a sintered body in which partially-stabilized zirconia crystal particles are mainly (as a main component) sintered, and has the partially-stabilized zirconia as a matrix phase. Oxides such as calcium oxide, magnesium oxide, yttrium oxide, cerium oxide and/or the like are mentioned as an example of a stabilizing agent for the partially-stabilized zirconia crystal particles. It is preferred that an amount of the stabilizing agent(s) is enough to partially stabilize the zirconia particles. If yttrium oxide is used as the stabilizing agent, for example, the content of yttrium oxide may be preferably 2 mol % to 5 mol % (about 3 mass % to 9 mass %) to zirconium oxide in the entire zirconia sintered body. The content of the stabilizing agent in the zirconia sintered body may be measured by an inductively coupled plasma (ICP) emission spectroscopy, for example.

In a burned (as-sintered) surface of the zirconia sintered body, the stabilizing agent(s) has a content enough to completely stabilize the burned surface, and in an interior (a region other than the burned surface) of the zirconia sintered body, the stabilizing agent(s) has a content that may partially stabilize the sintered body. It is considered that the zirconia sintered body has a region in which the content of the stabilizing agent(s) decreases from the burned surface of the zirconia sintered body toward the interior. According to a secondary ion mass spectrometry (SIMS), the region is considered to have a depth of 4 μm to 6 μm from the burned surface, for example. According to an X-ray photoelectron spectroscopy (XPS), a region from the burned surface to the depth of at least 5 nm[sic. μm] is considered to have the stabilizing agent(s) of 5 mol % or more and to preferably have the stabilizing agent(s) of 8 mol % or more, for example. An interior deeper than 100 μm from the burned surface of the zirconia sintered body is considered to have a content of the stabilizing agent of 2 mol % or more and less than 5 mol % and to preferably have the stabilizing agent(s) of 4 mol % or less, for example. As a method to increase the content of the stabilizing agent(s) in the burned surface of the zirconia sintered body, it is preferred not that the stabilizing agent is added from the outside of a compact before the burning but that a part of the stabilizing agent(s) included in raw materials migrates toward the burned surface during the burning.

In the following explanation, the term simply referred as "zirconia" means the partially-stabilized zirconia.

A main crystal system of the zirconia crystal particles in the zirconia sintered body of the present invention is a tetragonal system. It is preferred that any monoclinic crystal in the zirconia sintered body of the present invention is substantially not detected in an X-ray diffraction pattern before a low-temperature degradation acceleration test (hydrothermal test). Even though the monoclinic crystal is included in the zirconia sintered body of the present invention (in a state before the hydrothermal test), it is preferred that a ratio of a height of a peak existing near a position around 28° of 2θ where a [11-1] peak of the monoclinic system appears to a height of a peak existing near a position around 30° of 2θ where a [111] peak of the tetragonal system appears (that is, "the height of the peak existing near the position around 28° of 2θ where the [11-1] peak of the monoclinic system appears"/"the height of the peak existing near the position around 30° of 2θ where the [111] peak of the tetragonal system appears"; referred to as "the peak ratio" hereinafter) is 0.2 or less and preferably 0 to 0.1.

The burned (as-sintered) surface (and the neighborhood) of the zirconia sintered body of the present invention includes the cubic crystals more than the interior of the zirconia sintered body. Although the cubic crystals are observed when the X-ray diffraction pattern of the burned surface is measured, the cubic crystals are not substantially observed when the X-ray diffraction pattern of a surface exposed by grinding the burned surface by a depth of at least 100 μm is measured.

When the X-ray pattern of the burned surface of the zirconia sintered body of the present invention is measured and a peak height of the tetragonal crystals is compared with a peak height of the cubic crystals, it is preferred that a ratio of a height of a peak existing near a position around 35.2° of 2θ where a [200] peak of the cubic system appears to a height of a peak existing near a position around 35.3° of 2θ where a [200] peak of the tetragonal system appears (that is, "the height of the peak existing near the position around 35.2° of 2θ where the [200] peak of the cubic system appears "/" the height of the peak existing near the position around 35.3° of 2θ where the [11-1](sic. [200]) peak of the tetragonal system appears"; referred as "the peak ratio of the cubic system" hereinafter) is 0.35 or more, preferably 0.5 or more, and more preferably 1 or more.

The region having a depth of 100 μm or more from the burned surface of the zirconia sintered body of the present invention includes a large amount of tetragonal crystals and, preferably, substantially has the tetragonal system. In case where the burned surface of the zirconia sintered body of the present invention is ground by the depth of 100 μm or more, the X-ray diffraction pattern of the exposed surface is measured, and the peak height of the tetragonal crystals is compared with the peak height of the cubic crystals, it is preferred that the peak ratio of the cubic system is 0.3 or less, preferably 0.1 or less, more preferably 0.05 or less, and further preferably that any cubic crystal is substantially not detected. If the interior of the sintered body includes a large amount of the cubic crystals, it is considered that the flexural strength and fracture toughness are degraded. In the present invention, the term "grinding" includes polishing.

That the neighborhood of the burned surface of the zirconia sintered body of the present invention includes a large amount of the cubic crystals can be confirmed by a thin film X-ray diffraction method. In a region from the burned surface to the depth of about 8 μm (a region to the extent of an X-ray incident angle of 11°), when the peak height of the cubic crystal is compared with that of the tetragonal crystal, it is preferred that a ratio of a height of a peak existing near a position around 70.5° of 2θ where a [311] peak of the cubic system appears to a height of a peak existing near a position around 71.0° of 2θ where a [211] peak of the tetragonal system appears (that is, "the height of the peak existing near the position around 70.5° of 2θ where the [311] peak of the cubic system appears"/"the height of the peak existing near the position around 71.0° of 2θ where the [211] peak of the tetragonal system appears"; referred as "the peak ratio of the burned surface" hereinafter) is 0.5 or more, preferably 1 or more, and more preferably 2 or more.

In the zirconia sintered body of the present invention, even if a surface whose crystal system is mainly the tetragonal system is exposed by grinding the burned surface (the exposed surface after being sintered) or the surface of the zirconia sintered body, when the zirconia sintered body (the sintered body in which the ground surface is exposed) is burned again, it is found that, in the same way as the sintering, the cubic crystals more than those after grinding before re-burning are formed near the re-burning surface without any special treatment such as applying the stabilizing agent. This result is remarkable and exceeds expectations. When the burned surface or exposed surface of the zirconia sintered body of the present invention is ground, the surface in which the ratio of the height of the peak existing near the position where the [200] peak of the cubic system appears to the height of the peak existing near the position where the peak of the tetragonal system appears is 0.3 or less, more preferably 0.1 or less and further preferably 0.05 or less is exposed and burned again, in the X-ray diffraction pattern of the re-burned surface, the ratio of the height of the peak existing near the position where the [200] peak of the cubic system appears to the height of the peak existing near the position where the [200] peak of the tetragonal system appears is 0.4 or more, preferably 1 or more and more preferably 2 or more.

In the interior after the re-burning, main crystal system is the tetragonal system. In the X-ray diffraction pattern of the region having the depth of 100 μm or more from the re-burned surface, the ratio of the height of the peak existing near the position where the [200] peak of the cubic system appears to the height of the peak existing near the position where the [200] peak of the tetragonal system appears is 0.3 or less, more preferably 0.1 or less and further preferably 0.05 or less.

The re-burning temperature is preferably same as the sintering temperature and preferably ranging from 1450 degree Celsius to 1650 degree Celsius. The term "re-burning" in the present invention includes the HIP treatment, too.

The zirconia sintered body of the present invention includes at least one element of phosphorus (P), arsenic (As), antimony (Sb) and bismuth (Bi) (referred as "the group 15 element(s)" hereinafter). In view of safety, it is preferred that at least any one of phosphorus, antimony and bismuth in the group 15 element(s) is used. Especially, in view of an phase transition inhibitive effect, the strength of the sintered body and the cost, phosphorus is preferred.

It is preferred that the content of the group 15 element(s) in the zirconia sintered body of the present invention is $4 \times 10^{-4}$ mol to $4 \times 10^{-2}$ mol, preferably $4 \times 10^{-3}$ mol to $3 \times 10^{-2}$ mol and more preferably $8 \times 10^{-3}$ mol to $2 \times 10^{-2}$ mol to 1 mol of zirconium oxide (IV). If the content of the group 15 element(s) is in this range, the inhibitive effect of the phase transition from the tetragonal system to the monoclinic system appears.

If phosphorus is used as the group 15 element(s), in view of the phase transition inhibitive effect, it is preferred that the content of phosphorus in the zirconia sintered body is 0.01 mass % to 1 mass %, preferably 0.1 mass % to 0.6 mass % and more preferably 0.2 mass % to 0.5 mass %.

The content of the group 15 element(s) in the zirconia sintered body may be measured by a composition analysis of the zirconia sintered body. The content of the group 15 element(s) in the zirconia particles as the raw material and addition rate of the group 15 element(s) added upon making the zirconia sintered body (namely, the content before the burning) may be regarded as the content of the group 15 element(s) in the zirconia sintered body (namely, the content after the burning). Provided that some ingredient disappears from the zirconia sintered body by the burning, and the content before the burning is substantially not considered as the content after the burning, the content is measured by the composition analysis. The content of the group 15 element(s) in the zirconia sintered body may be measured by the inductively coupled plasma (ICP) emission spectroscopy, for example.

The group 15 element(s) may be present in the zirconia crystal particle and in crystal grain boundary. That is, the group 15 element(s) may be added upon making the zirconia crystal particles and may be mixed with the zirconia crystal particles before being shaped to a predetermined form.

It is preferred that the zirconia sintered body of the present invention further includes silicon dioxide. If the group 15 element(s) (especially phosphorus) and silicon dioxide are included in the zirconia sintered body, the phase transition inhibitive effect is further enhanced than the case of the group 15 element(s) alone. In view of the phase transition inhibitive effect, it is preferred that the content of silicon dioxide in the zirconia sintered body of the present invention is 0.03 mass % to 3 mass %, preferably 0.05 mass % to 1 mass %, and more preferably 0.1 mass % to 0.8 mass %.

The content of silicon dioxide in the zirconia sintered body may be measured by a composition analysis of the zirconia sintered body. The content of silicon dioxide in the zirconia particles as the raw material and addition rate of silicon dioxide added upon making the zirconia sintered body (namely, the content before the burning) may be regarded as the content of silicon dioxide in the zirconia sintered body (namely, the content after the burning). Provided that some ingredient disappears from the zirconia sintered body by the burning, and the content before the burning is substantially not considered as the content after the burning, the content is measured by the composition analysis. The content of silicon dioxide in the zirconia sintered body may be measured by the inductively coupled plasma (ICP) emission spectroscopy, for example.

Silicon dioxide may be included in the zirconia crystal particle and in crystal grain boundary. That is, silicon dioxide may be added in time of making the zirconia crystal particles and may be mixed with the zirconia crystal particles before being shaped to a predetermined form.

According to the SISM, the contents of phosphorus and silicon dioxide in the neighborhood of the burned surface, especially the region having the high content of the cubic crystals (the region having the high content of the stabilizing agent) are lower than in the interior of the sintered body. For example, it is considered that the contents of the phosphorus and silicon dioxide are low in the region from the burned surface to the depth of 4 μm, and that the contents have a tendency to increase in the region having at least the depth of 4 μm to 6 μm from the burned surface.

By the burning to sinter the raw material powder, as described above, the burned surface of the zirconia sintered body of the present invention has the high content of the stabilizing agent and high presence rate of the cubic crystals. In the zirconia sintered body of the present invention, even if the layer including a large amount of the cubic crystals (the layer having the high content of the stabilizing agent) is removed by grinding the burned surface, and the exposed layer including a large amount of the tetragonal crystals is re-burned, as described above, in the re-burned surface, the content of the stabilizing agent(s) can be increased, and the presence rate of the cubic crystals can also be increased. Accordingly, in the present invention, by re-burning the zirconia sintered body processed to a desired shape, the zirconia sintered body in which a speed of the hydrothermal degradation is reduced can be obtained. That is, the zirconia sintered body also having high precision of the processing size can be obtained.

It is considered that, in the zirconia sintered body of the present invention, phosphorus has an effect to migrate the stabilizing agent(s) toward the burned surface by the burning.

In the preferred zirconia sintered body of the present invention, even if the hydrothermal treatment test (a low-temperature degradation acceleration test) is performed, the phase transition from the tetragonal crystal to the monoclinic crystal can be inhibited. Especially, in the sintered body burned at 1450 degrees Celsius or more, the phase transition inhibitive effect is outstanding. When the hydrothermal treatment at a temperature of 180 degrees Celsius and a pressure of 1 MPa for five hours is applied to the zirconia sintered body of the present invention, for example, in the X-ray diffraction pattern of the surface of the zirconia sintered body after the hydrothermal treatment, it is preferred that the peak ratio is 1 or less, preferably 0.5 or less, more preferably 0.1 or less, further preferably 0.05 or less, and further preferably 0.01 or less.

When the hydrothermal treatment at the temperature of 180 degrees Celsius and the pressure of 1 MPa for 24 hours is applied to the zirconia sintered body of the present invention, in the X-ray diffraction pattern of the surface of the zirconia sintered body after the hydrothermal treatment, it is preferred that the peak ratio is 3 or less, preferably 2 or less, more preferably 1.5 or less, further preferably 1 or less, and further preferably 0.5 or less.

Even if the hydrothermal treatment test is performed, the flexural strength of the preferred zirconia sintered body of the present invention can be maintained at a high level. When the hydrothermal treatment at the temperature of 180 degrees Celsius and the pressure of 1 MPa for 24 hours is applied to a test piece of the zirconia sintered body of the present invention having a size of 4 mm×25 mm×0.2 mm, for example, it is preferred that the flexural strength of the test piece after the hydrothermal treatment, which is measured in conformity to JISR1601 except the size of the test piece, is 50 MPa or more, preferably 100 MPa or more, more preferably 500 MPa or more, further preferably 800 MPa or more, and further preferably 1,000 MPa or more.

Even if the hydrothermal treatment is applied to the preferred zirconia sintered body of the present invention, the size change is small, and therefore the size precision can be kept high. When the hydrothermal treatment at the temperature of 180 degrees Celsius and the pressure of 1 MPa for 24 hours is applied to the zirconia sintered body of the present invention, it is preferred that an expansion rate of a width of the test piece of the zirconia sintered body after the hydrothermal treatment, which is measured in conformity to JISR1601, is 0.6% or less, preferably 0.5% or less, more preferably 0.3% or less, further preferably 0.1% or less, and further preferably 0.05% or less, to the width of the test piece before the hydrothermal treatment.

The phase transition inhibitive effect in the zirconia sintered body of the present invention is not affected by the particle size in the zirconia sintered body. Accordingly, the particle size can be suitably determined in accordance with a use.

The zirconia sintered body of the present invention preferably has a semi-transparency and colorlessness. An appearance of the zirconia sintered body of the present invention can be adjusted by adding pigment or the like in accordance with a use. The zirconia sintered body of the present invention may be preferably used as a dental material such as prosthesis. It is preferred that the zirconia sintered body of the present invention does not have mat and un-sintered appearance.

The zirconia crystal particle in the interior of the zirconia sintered body of the present invention may have an average particle size of a primary particle of 0.1 μm to 5 μm. The average particle size of the primary particle may be given as an average value of major axes and minor axes of 100 primary particles chosen from a SEM (Scanning Electron Microscope) picture at random. According to the SEM picture, in the region from the burned surface to the depth of 5 μm, the zirconia crystal particles do not show a clear contour or boundary and are in a fused state. In an entire disclosure of the present invention, each value range includes a free intermediate value among the range even though it is not recited clearly, and the recitation of the intermediate value is omitted for convenience.

Next, a mixture, pre-sintered compact and pre-sintered calcined body for sintering the zirconia sintered body will be explained. The mixture, the compact and the calcined body are a precursor (an intermediate product) of the zirconia sintered body of the present invention.

That is, on the basis of the mixture, the compact and the calcined body, the zirconia sintered body having at least one property among the above properties can be obtained.

The mixture for the sintering of the present invention includes partially-stabilized zirconia crystal particles, a simple substance(s) of a group 15 element(s) or a compound(s) including the group 15 element(s). The simple substance of the group 15 element or the compound including the group 15 element(s) may be included in the zirconia crystal particle or may exist (in a grain boundary) between the zirconia crystal particles. The zirconia crystal particles may be granulated. It is preferred that the content of the group 15 element(s) in the mixture for sintering is $4 \times 10^{-4}$ mol to $4 \times 10^{-2}$ mol, preferably $4 \times 10^{-3}$ mol to $3 \times 10^{-2}$ mol and more preferably $8 \times 10^{-3}$ mol to $2 \times 10^{-2}$ mol to 1 mol of zirconium oxide (IV). When two or more atoms of the group 15 element(s) are included in one molecule of the compound including the group 15 element(s), the content of the group 15 element(s) is calculated on the basis of the molar number not of the compound including the group 15 element but of the group 15 element. When phosphorus is used as the group 15 element, in view of the phase transition inhibitive effect, it is preferred that the content of phosphorus in the mixture is 0.01 mass % to 1 mass %, preferably 0.1 mass % to 0.6 mass % and more preferably 0.2 mass % to 0.5 mass % to the partially-stabilized zirconia particles.

Oxides such as calcium oxide, magnesium oxide, yttrium oxide, cerium oxide and the like are given as an example of a stabilizing agent for the partially-stabilized zirconia crystal particles. It is preferred that an amount of the stabilizing agent(s) is present enough to partially stabilize the zirconia particles. If yttrium oxide is used as the stabilizing agent(s), for example, the content of yttrium oxide may be preferably 2 mol % to 5 mol % (about 3 mass % to 9 mass %) to the partially-stabilized zirconium oxide. The content of the stabilizing agent(s) in the mixture may be measured by an inductively coupled plasma (ICP) emission spectroscopy, for example.

In the composition (composite) for the sintering (unburned, green material), the surface (exposed surface) of the compact does not include more stabilizing agent(s) than the interior of the compact (shaped or molded body). Between a part to become the surface of the sintered body and a part to become the interior of the sintered body, the content of the stabilizing agent(s) is same.

It is preferred that the mixture of the present invention further includes silicon dioxide. Silicon dioxide may be included in the zirconia crystal particle or may exist (in the grain boundary) between the zirconia crystal particles. If the group 15 element(s) (especially phosphorus) and silicon dioxide are included in the mixture, the phase transition inhibitive effect on the low-temperature degradation of the zirconia sintered body can be further enhanced than the case including only the group 15 element(s). In view of the phase transition inhibitive effect, it is preferred that the content of silicon dioxide in the mixture of the present invention is 0.03 mass % to 3 mass %, preferably 0.05 mass % to 1 mass %, and more preferably 0.1 mass % to 0.8 mass %.

The particle size of the zirconia crystal particle is not limited, and the particle size suitable to make a desired sintered body may be determined.

The mixture may be powder, may be in a solvent, or may include a solvent. The mixture may include an additive such as a binder.

The compact of the present invention is made by shaping the mixture of the present invention. The compact of the present invention may be formed by any shaping (or compacting) method and may be formed by press molding, injection molding, and stereolithography, for example. The compact of the present invention may be also formed by multi-step processing. A CIP (Cold Isostatic Pressing) may be applied to the mixture of the present invention after the press molding, for example. The contents of the group 15 element(s) and of silicon dioxide in the compact of the present invention are same as in the mixture before the sintering (sic. shaping), and therefore these explanations are omitted.

The calcined body of the present invention is made by burning the compact of the present invention at a low temperature insufficient to sinter the zirconia particles or by partially sintering the zirconia particles of the compact of the present invention. The contents of the group 15 element(s) and of silicon dioxide in the calcined body of the present invention are same as the mixture before the shaping, and therefore these explanations are omitted.

Next, methods for manufacturing the zirconia sintered body of the present invention and the mixture, compact and calcined body for sintering the zirconia sintered body will be explained.

As one exemplary embodiment of the present invention, a manufacturing method in which desired amounts of the group 15 element(s) and silicon dioxide are not included in the zirconia crystal particle will be explained below.

First, a mixture of the present invention is formed by mixing the zirconia crystal particles and a compound including the group 15 element(s) or a simple substance of the group 15 element(s). The zirconia crystal particles and the compound(s) including the group 15 element(s) or the simple substance of the group 15 element(s) are mixed. It is preferred that the content of the group 15 element is added $4 \times 10^{-4}$ mol to $4 \times 10^{-2}$ mol, preferably $4 \times 10^{-3}$ mol to $3 \times 10^{-2}$ mol and more preferably $8 \times 10^{-3}$ mol to $2 \times 10^{-2}$ mol to 1 mol of zirconium oxide (IV). When two or more atoms of the group 15 element(s) are included in one molecule of the compound(s) including the group 15 element(s), the content of the group 15 element(s) is calculated on the basis of the molar number not of the compound including the group 15 element(s) but of the group 15 element(s).

When a compound including phosphorus is used as the compound including the group 15 element, the compound including phosphorus may be an inorganic compound or organic compound. If the inorganic compound is used, phosphoric acids and phosphates, for example, may be used. In this case, phosphoric acid ($H_3PO_4$), aluminum phosphate ($AlPO_4$), magnesium phosphate ($Mg_3(PO_4)_2$), calcium phosphate ($Ca_3(PO_4)_2$), magnesium hydrogenphosphate ($MgHPO_4$), magnesium dihydrogenphosphate ($Mg(H_2PO_4)_2$), calcium hydrogenphosphate ($CaHPO_4$), ammonium dihydrogenphosphate (($NH_4)H_2PO_4$), and the like may be used, for example. If the organic compound is used, phosphine oxides may be used, for example.

When a compound including arsenic is used as the compound including the group 15 element, an arsenic oxide compound and the like may be used, for example.

When a compound including antimony is used as the compound including the group 15 element, an antimony oxide compound and the like may be used, for example.

When a compound including bismuth is used as the compound including the group 15 element, a bismuth oxide compound and the like may be used, for example.

If the zirconia sintered body of the present invention is used for a human body like a dental prosthesis, it is preferred that the group 15 element has a slight bad influence on a human body and more preferably is harmless to a human body.

It is preferred that silicon dioxide is further added to the mixture. It is preferred that silicon dioxide is included 0.03 mass % to 3 mass %, preferably 0.05 mass % to 1 mass %, and more preferably 0.1 mass % to 0.8 mass % to the partially-stabilized zirconia particles.

An appropriate particle size of the zirconia crystal particle is suitably determined.

A binder may be added to the mixture for sintering. Whether or not the binder is added may be suitably determined according to a manufacturing purpose of the zirconia sintered body. If the binder is used, a binder of an acrylic type may be used, for example.

A mixing method may be wet mixing or dry mixing. If the wet mixing is performed, water, alcohol and the like may be used as a solvent, for example. The mixing is performed by a manual mixing or mechanical mixing. If the zirconia crystal particles before the mixing form secondary particles, it is preferred that the secondary particles are collapsed as much as possible before the mixing if possible.

As a method for adding a stabilizing agent to the zirconia crystal particles, a hydrolysis method, neutralization coprecipitation method, alkoxide method, solid phase method and the like may be used. When $ZrO_2$ with solid-solute $Y_2O_3$ obtained by the solid phase method is used to make the sintered body, the fracture toughness can be enhanced. Especially, if the zirconia sintered body including phosphorus is made by the solid phase method, the zirconia sintered body can have higher fracture toughness by a synergistic effect.

Secondly, the compact is made by shaping the mixture to a desired form by the press molding. Preferable methods may be appropriately determined as the press molding method. Applied pressure may be 20 MPa or more, for example. After the press molding, the CIP (Cold Isostatic Pressing) may be applied to the compact at a pressure of 150 MPa or more, for example.

Before the press molding, the mixture may be a granule of the zirconia particles. If a solvent is used in the mixing, the solvent is removed before the press molding or a preparatory molding. The solvent may be removed by spray drier when the particles are granulated or by an oven drying.

The compact may be processed to a desired shape by cutting, grinding or the like after the press molding.

Thirdly, the calcined body for the sintering may be made by calcining the compact before the sintering. A calcining condition may be determined to be at a calcining temperature of 800 degrees Celsius to 1200 degrees Celsius for a retention time of 1 hour to 3 hours.

The calcined body may be processed to be a desired shape by cutting, grinding or the like after calcining.

Fourthly, the zirconia sintered body is made by burning the compact or calcined body to sinter the zirconia particles. It is preferred that sintering temperature is 1450 degrees Celsius or over. If the sintering temperature is less than 1450 degrees Celsius, the formation of the cubic crystals in the burned surface is not enough, and therefore resulting in insufficient inhibition of the low-temperature degradation. The higher the burning temperature is, the more the cubic crystals are formed in the burned surface, and therefore the phase transition inhibitive effect on the low-temperature degradation can be improved. The zirconia sintered body of the present invention which is made, preferably, by being burned at the temperature of 1500 degrees Celsius or more and, more preferably, at the temperature of 1550 degrees Celsius or more can effectively inhibit the phase transition to the monoclinic crystal which may be caused by the hydrothermal treatment. It is considered that the reason is that the stabilizing agent(s) migrates to the surface by the burning and that a part of the surface becomes the cubic system.

The burning may be performed under the atmosphere at an atmospheric pressure.

Fifthly, the HIP treatment may be further applied to the zirconia sintered body in order to be further densified.

Sixthly, after the zirconia sintered body is processed to a desired shape, the zirconia sintered body may be burned at the temperature of 1350 degrees Celsius or more again. Thereby, the re-burned surface can be caused to include the cubic system (crystals) again.

In the above explanation of the method of manufacturing the zirconia sintered body, although the desired amounts of the compound including group 15 element(s) and of silicon dioxide are not included in the zirconia crystal particles, at least one of the desired amounts of the compound(s) including group 15 element(s) and of silicon dioxide may be originally included in the zirconia crystal particles, or a part of the desired amounts of the compound(s) including group 15 element(s) and of silicon dioxide may be included in the zirconia crystal particles. In this case, each additive amount is adjusted considering the content of the compound(s) including the group 15 element(s) or of silicon dioxide in the zirconia crystal particles. If the desired amount of silicon dioxide is included in the zirconia crystal particles, for example, only the compound(s) including the group 15 element(s) is added when the mixture is made. If a part of the desired amount of silicon dioxide is included in the zirconia crystal particles, the remnant of the desired amount of silicon dioxide in addition to the compound(s) including the group 15 element(s) may be added when the mixture is made. A method other than this is same as the above method. In the prevent invention, "group 15" is based on an 18-group long-period periodic table.

EXAMPLES

Examples 1-45

Manufacturing of Zirconia Sintered Body and Hydrothermal Treatment

In Examples 1 to 45, zirconia sintered bodies including phosphorus as the group 15 element(s) and silicon dioxide and zirconia sintered bodies including phosphorus, in which silicon dioxide is merely included in material particles as impurities, were made. The content of phosphorus and sintering temperature were different among the zirconia sintered bodies. The hydrothermal treatment which was an acceleration test of the low-temperature degradation was applied to each zirconia sintered body, and the peak ratio in each zirconia sintered body after the hydrothermal treatment was measured. As a comparison (comparative example), zirconia sintered bodies to which any compound including phosphorus was not added were also made, and the peak ratio in each zirconia sintered body after the hydrothermal treatment was measured.

Composition data of the zirconia sintered bodies made in the examples and comparisons are shown in Tables 1 to 12.

Examples 1-34

Zirconia powder used as a raw material in Examples 1-34 and Comparison 1 was partially-stabilized tetragonal zirconia powder, made by Noritake Co., Ltd, including 5.2 mass % (3 mol %) of yttrium oxide, 0.1 mass % of silicon dioxide and about 0.5 mass % of alumina in a crystal particle(s).

Examples 35-46

Zirconia powder used as a raw material in Examples 35-46 and Comparison 2 was partially-stabilized tetragonal zirconia powder, made by Tosoh Corporation; Product Number TZ-3Y-E, including 5.2±0.5 mass % (3 mol %) of yttrium oxide in a crystal particle. The content of silicon dioxide in the zirconia powder was 0.02 mass % or less, which was a product standard value, and the content of alumina was 0.1 mass % to 0.4 mass %, which was a product standard value.

Examples 47-48

Zirconia powder used as a raw material in Examples 47-48 and Comparisons 3-4 was partially-stabilized tetragonal zirconia powder, made by Daiichi Kigenso Kagaku Kogyo Co., Ltd, including 5.7±0.2 mass % of yttrium oxide in a crystal particle(s). The zirconia powder (Product Number HSY-3F) used in Example 47 and Comparison 3 included 0.25±0.1 mass % of alumina, which was a product standard value, and the zirconia powder (Product Number HSY-3F-NA) used in Example 48 and Comparison 4 included no alumina.

[Compound Including Phosphorus]

In Examples 1-48, in order to make phosphorus include in the zirconia sintered bodies, inorganic compounds including phosphorus shown in Tables 1-11 were added to the zirconia powder. With regard to the used compounds including phosphorus, phosphoric acid was made by Kanto Chemical Co., Inc., aluminum phosphate was made by Taki Chemical Co., Ltd., magnesium dihydrogenphosphate was made by Yoneyama Chemical Industry Co., Ltd., and calcium hydrogenphosphate and ammonium dihydrogenphosphate were made by Kanto Chemical Co., Inc.

[Manufacturing of Zirconia Sintered Body]

In Examples 1-48, the compound including phosphorus shown in Tables 1-11 was added to the zirconia powder, the zirconia powder and the compound including phosphorus were mixed in water, pulverizing the zirconia powder, and then the mixture for the sintering was made. Addition rates shown in Tables 1-11 indicate mass (weight) percentages of phosphorus element to the mass (weight) of the zirconia powder including yttrium oxide. In Examples 6-10, a binder of an acrylic type (6 mass %) was further added. In Comparisons 1-4, no compound including phosphorus was added to the zirconia powder. In Examples 1-48 and Comparisons 1-4, no silicon dioxide was added. That is, the contents of silicon dioxide shown in Tables 1-12 indicate weight percentages of silicon dioxide included in the zirconia crystal particles including yttrium oxide. Next, in the mixture, the solvent was removed by a spray drier and then the zirconia particles were granulated. Next, the mixtures were shaped by a press at a pressure of 30 MPa, and the compacts having a diameter of 19 mm and thickness of 2 mm were made. Next, the compacts were burned at temperatures shown in Tables 13-24 for 1.5 hours to make the zirconia sintered bodies. In Example 1-48, these sintered bodies are referred as "test pieces".

[Hydrothermal Treatment]

The hydrothermal treatment which is an acceleration test of low-temperature degradation was applied to each test piece in the examples. The test method was in conformity with ISO13356 other than temperature, pressure and processing time. Pure water for applying heat and pressure was put into a heat-resistant and pressure-resistant container (autoclave), and the test piece was set in the container so as not to be soaked in the water. Next, after a lid was fixed to the container with bolts, the temperature in the container was increased to 180 degrees Celsius and the pressure was increased to about 1.0 MPa (10 atmospheric pressure). Each test piece was kept in this state for five hours in the container.

[X-Ray Diffraction Measurement]

Next, in order to measure a peak ratio of each test piece after the hydrothermal treatment, an X-ray diffraction pattern of a surface of each test piece after the hydrothermal treatment was measured. The X-ray diffraction patterns was measured with Cu-target, at 50 kV and 50 mA, using RINT-TTR III made by Rigaku Corporation. Tables 13-24 show the peak ratios of the test pieces every sintering temperatures (degree Celsius). The peak ratio shown in Tables 13-24 is a value that is 100 times multiplied of a ratio of a height of a peak existing near a position around 28° of 2θ where a [11-1] peak of the monoclinic system appears to a height of a peak existing near a position around 30° of 2θ where a [111] peak of the tetragonal system appears. That is, the value shown in Tables 13-24 is a value calculated by the following formula. In Table 13-24, a mark "x" means that the test piece showed conspicuous destruction by the hydrothermal treatment. On the last line in each table, values of the comparisons are presented. The examples and comparison in each table use the same zirconia material and are different only in existence or nonexistence of the compound including phosphorus.

After all diffraction patterns were smoothed with Jade 6 which was an analytical software of an X-ray diffraction pattern, provided by Rigaku Corporation, the peak ratio was measured. In a background process, a background threshold value σ was set to 10.0. In the examples of the present invention, the peak ratios were measured in the same manner.

[Test Result]

Figure 2:
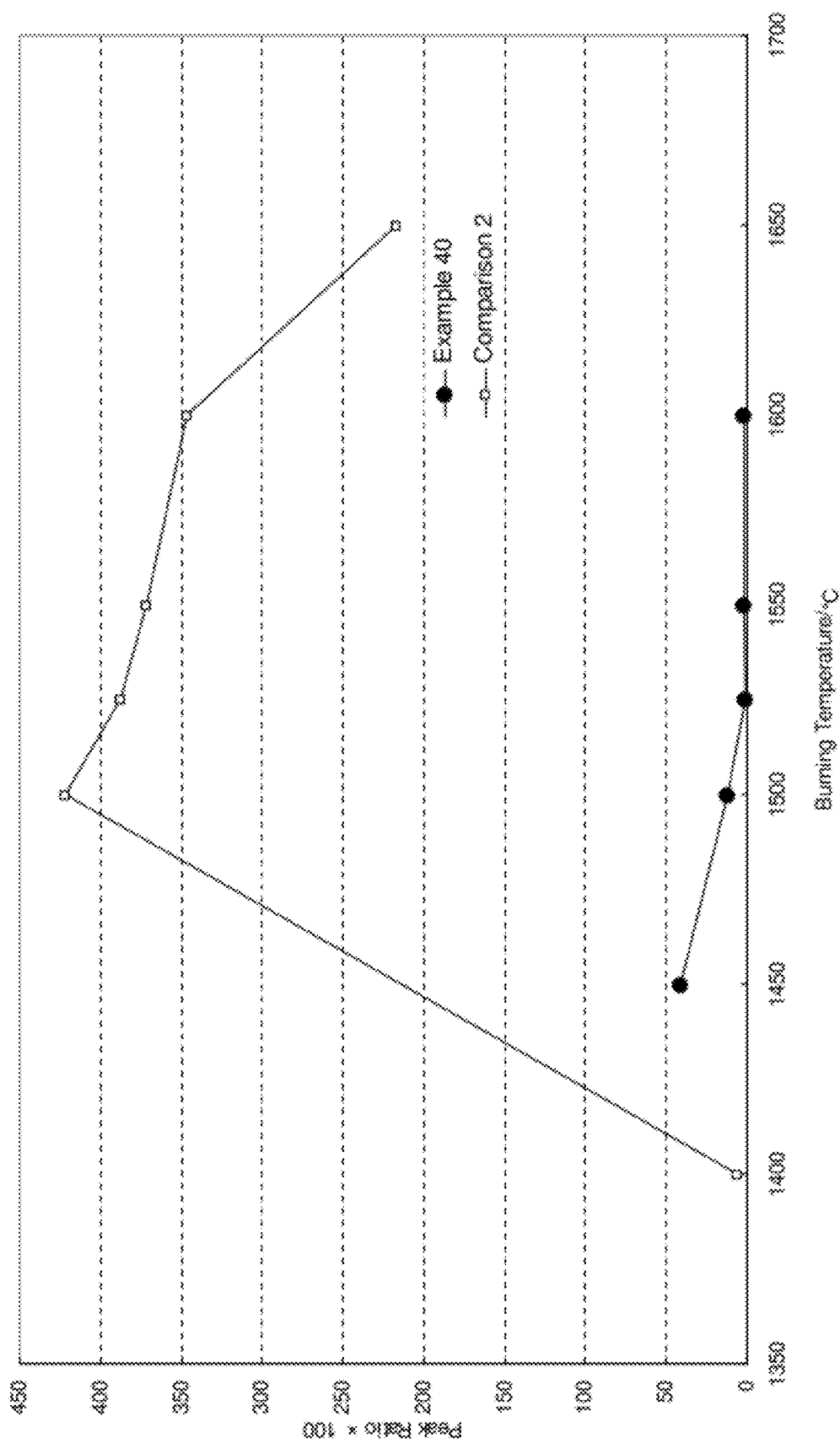
FIG. 2 is a graph to compare Example 40 in Table 21 with Comparison 2.

As an example of low silicon dioxide content, FIG. 2 is the graph to compare Example 40 in Table 21 with Comparison 2.

When the examples are compared with the comparisons in Tables 13-24, it is found that the sintered bodies including phosphorus have lower ratios of the monoclinic crystals than phosphorus-additive-free sintered bodies. Therefore, it is found that, if phosphorus is included in the zirconia sintered body, progress of the phase transition to the monoclinic crystal can be inhibited. According to the present invention, the zirconia sintered body having a long durable life and high strength can be obtained.

In the comparisons, although the sintered body burned at the temperature of 1400 degrees Celsius can inhibit the phase transition, the phase transition sharply proceeded if the burning temperature is higher than 1400 degree Celsius. In the examples, however, the higher the burning temperature is (especially, higher than the range of 1525 degrees Celsius to 1550 degrees Celsius), the more the progress of the phase transition is inhibited. Therefore, if the zirconia sintered body including phosphorus is made, the zirconia sintered body burned at higher temperature can be obtained. Thus, according to the present invention, the zirconia sintered body having higher strength can be obtained.

When Example 11 in Table 14 is compared with Comparison 1, the sintered body including phosphorus of 0.01 mass % ($4 \times 10^{-4}$ mol to 1 mol of zirconium oxide) can inhibit the phase transition than the sintered body to which no phosphorus is added. When Example 19 in Table 14 is compared with Comparison 1, the sintered body including phosphorus of 1 mass % ($4 \times 10^{-2}$ mol to 1 mol of zirconium oxide) can inhibit the phase transition than the sintered body to which no phosphorus is added.

In Examples 13-18, when the phase transition inhibitive effects of the compounds including phosphorus are compared, phosphoric acid, aluminum phosphate and magnesium dihydrogenphosphate have a higher effect on the phase transition inhibition. In view of an observation of an external appearance, the sintered body using phosphoric acid is most suitable.

Figure 3:
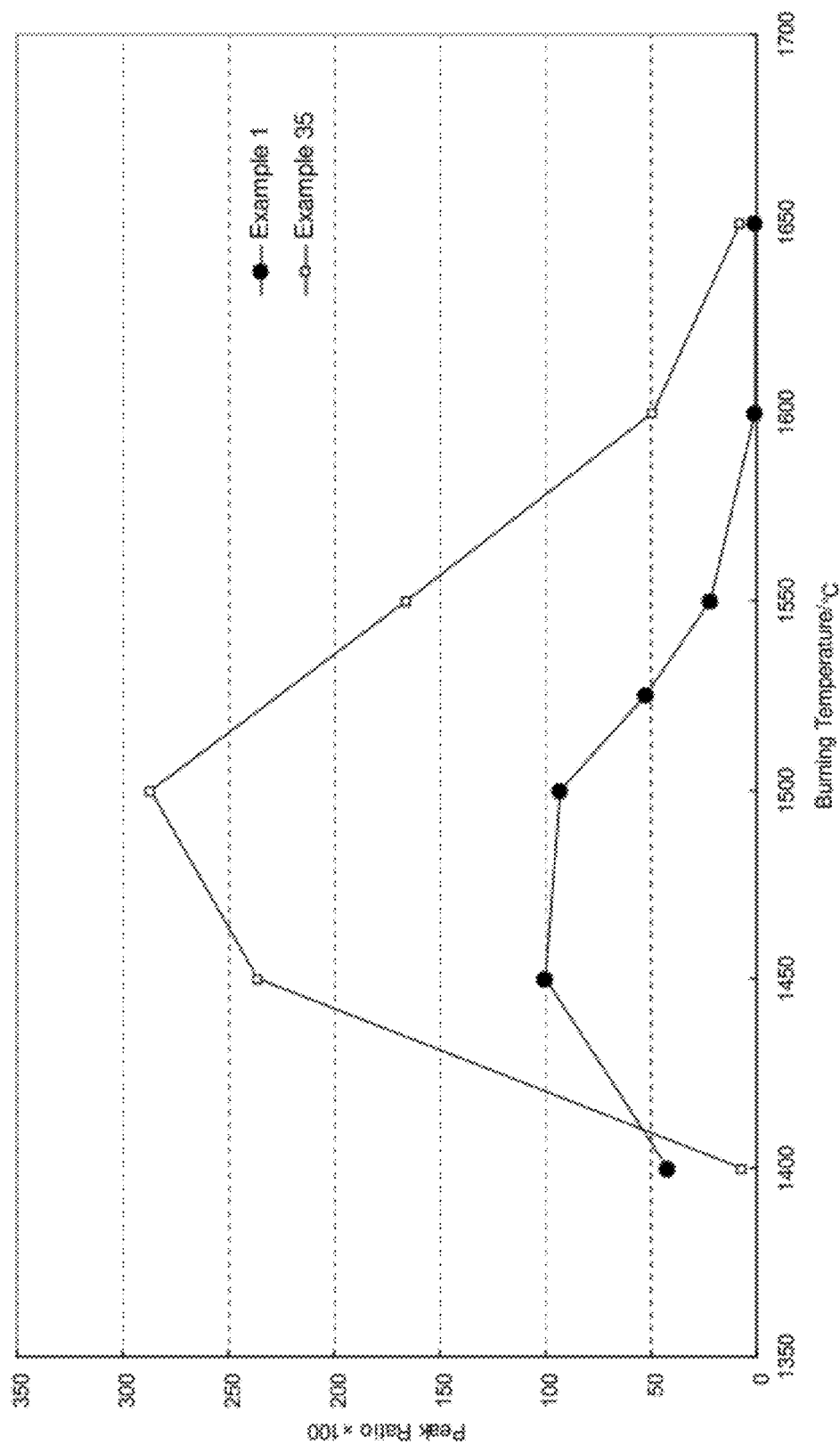
FIG. 3 is a graph to compare Example 1 in Table 13 with Example 35 in Table 19.

FIG. 3 illustrates a graph to easily compare high and low contents of silicon dioxide. As representative examples of the high and low contents of silicon dioxide, FIG. 3 is the graph to compare Example 1 in Table 13 with Example 35 in Table 19, and phosphoric acid of 0.1 mass % was added in both examples. Examples 1 and 35 are different in the content of silicon dioxide. According to FIG. 3, higher content of silicon dioxide has a higher effect on the phase transition inhibition. Although also there were test pieces having a high effect on the phase transition inhibition as shown in Tables 16-18 even though the content of silicon dioxide was low, there were also some test pieces in which the hydrothermal treatment caused cracks or destruction as shown in Tables 16, 19 and 20.

However, when the content of silicon dioxide was high, there was observed no test piece destroyed by the hydrothermal treatment. When the external appearances of the sintered bodies were compared, the sintered body having lower content of silicon dioxide looked mat and un-sintered as compared with the sintered body having higher content of silicon dioxide, and the sintered body having higher content of silicon dioxide was also suitable for the external appearance. It has turned out that in case not only phosphorus but also silicon dioxide is included the phase transition inhibitive effect can be enhanced. That is, if phosphorus and silicon dioxide are included, the zirconia sintered body having longer durable life and higher strength can be obtained.

Figure 4:
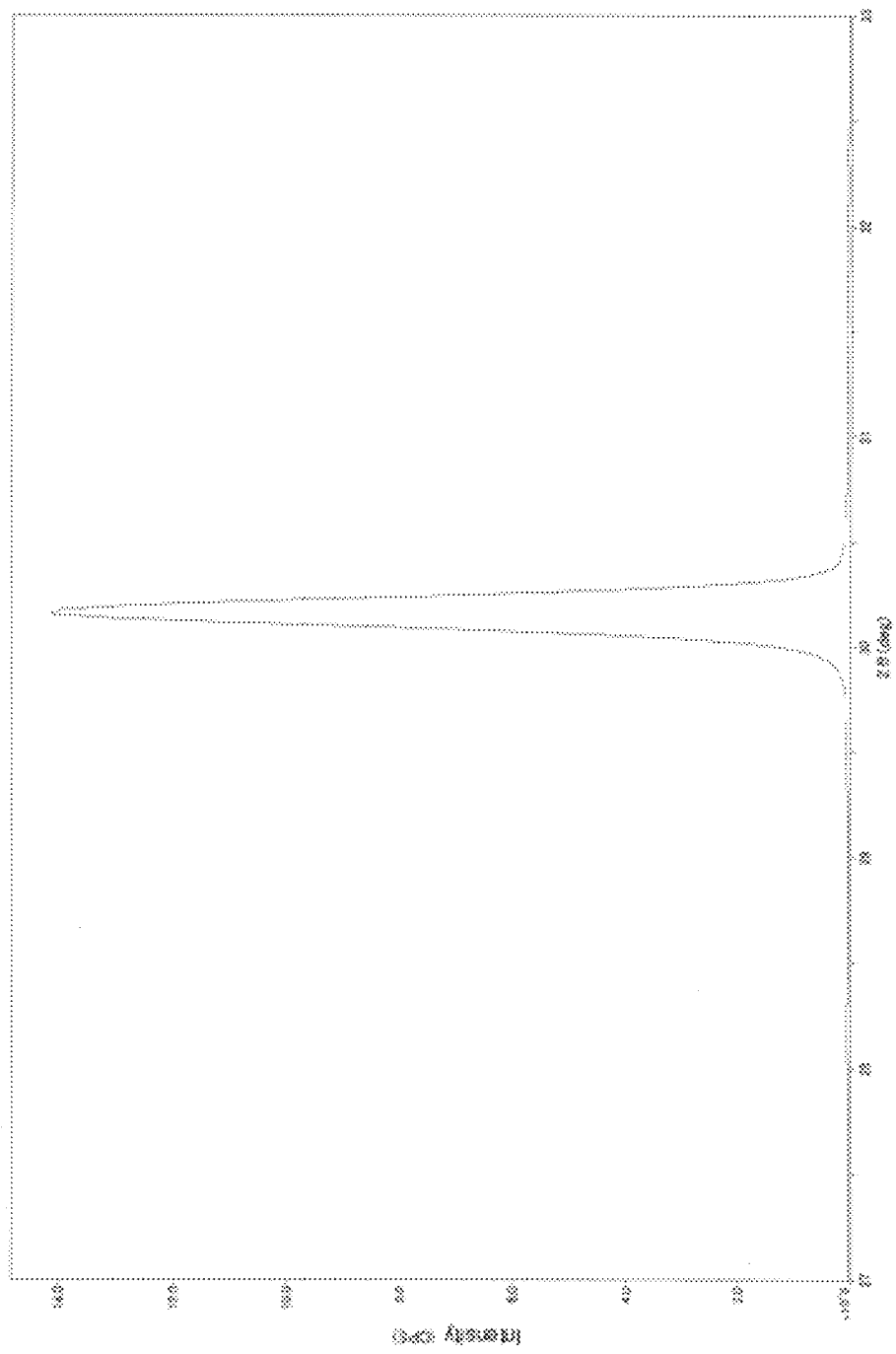
FIG. 4 is an X-ray diffraction pattern of a sintered body before hydrothermal treatment, made in Example 4.
Figure 5:
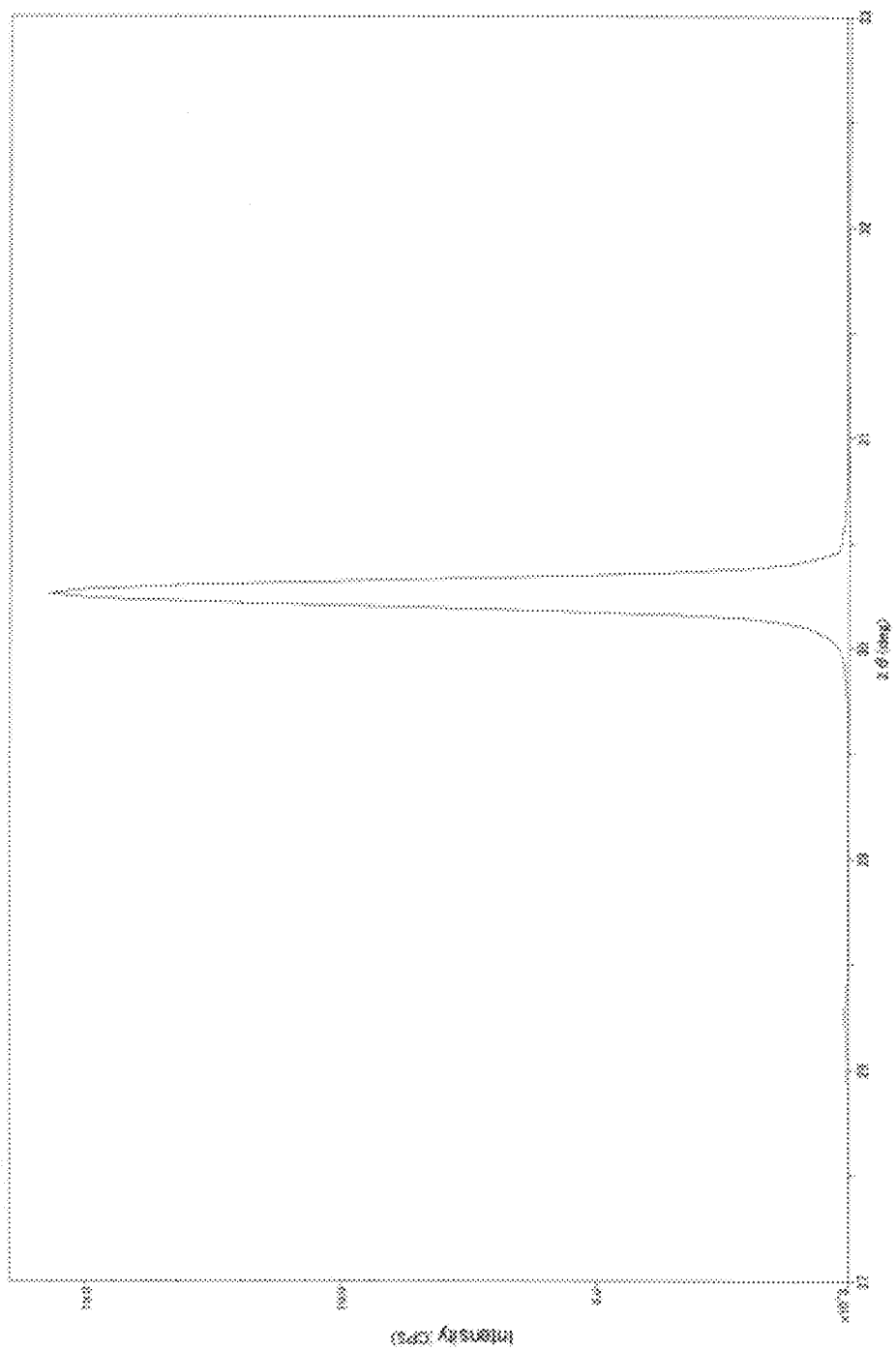
FIG. 5 is an X-ray diffraction pattern of a sintered body after hydrothermal treatment, made in Example 4.
Figure 6:
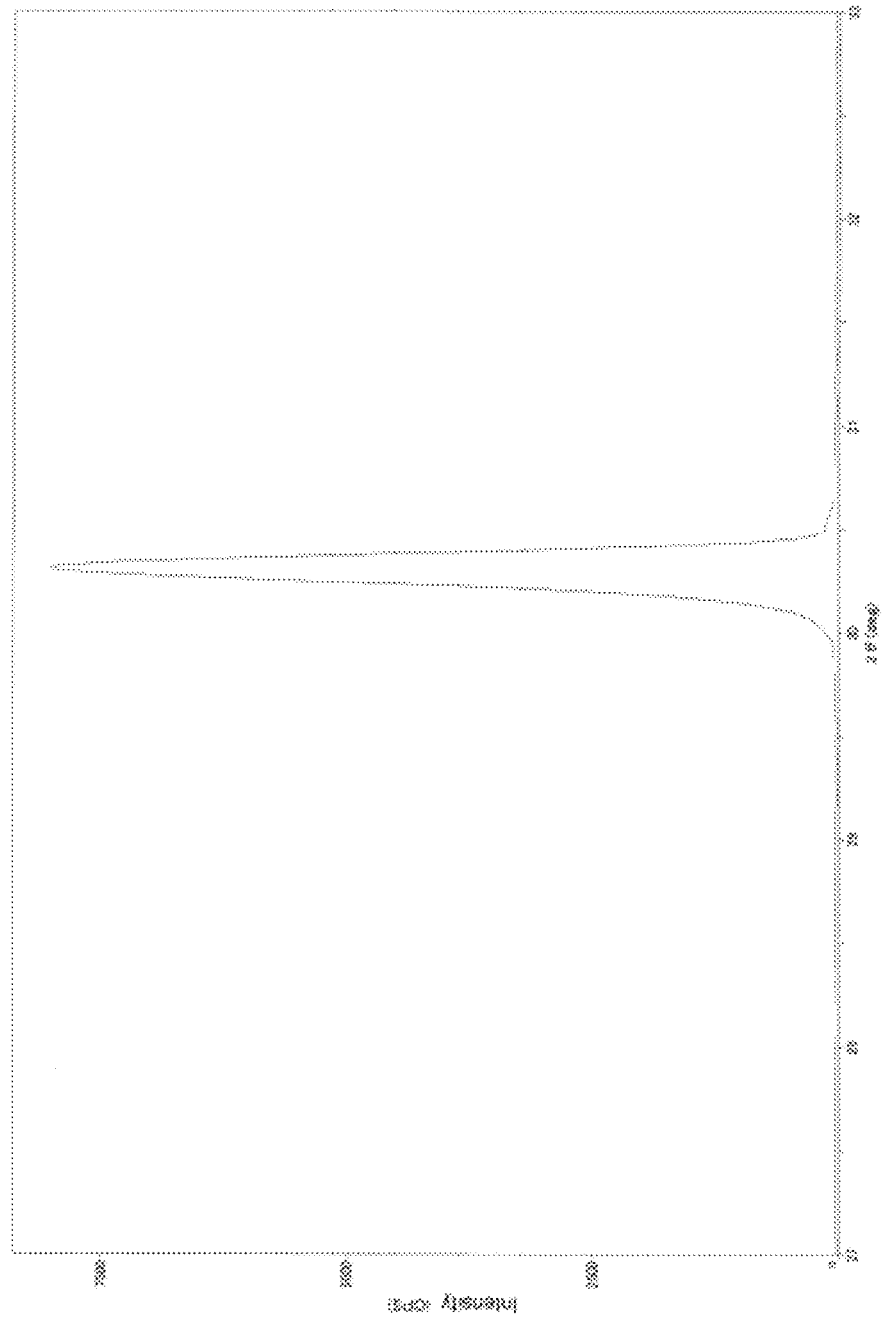
FIG. 6 is an X-ray diffraction pattern of a sintered body before hydrothermal treatment, made in Comparison 2.
Figure 7:
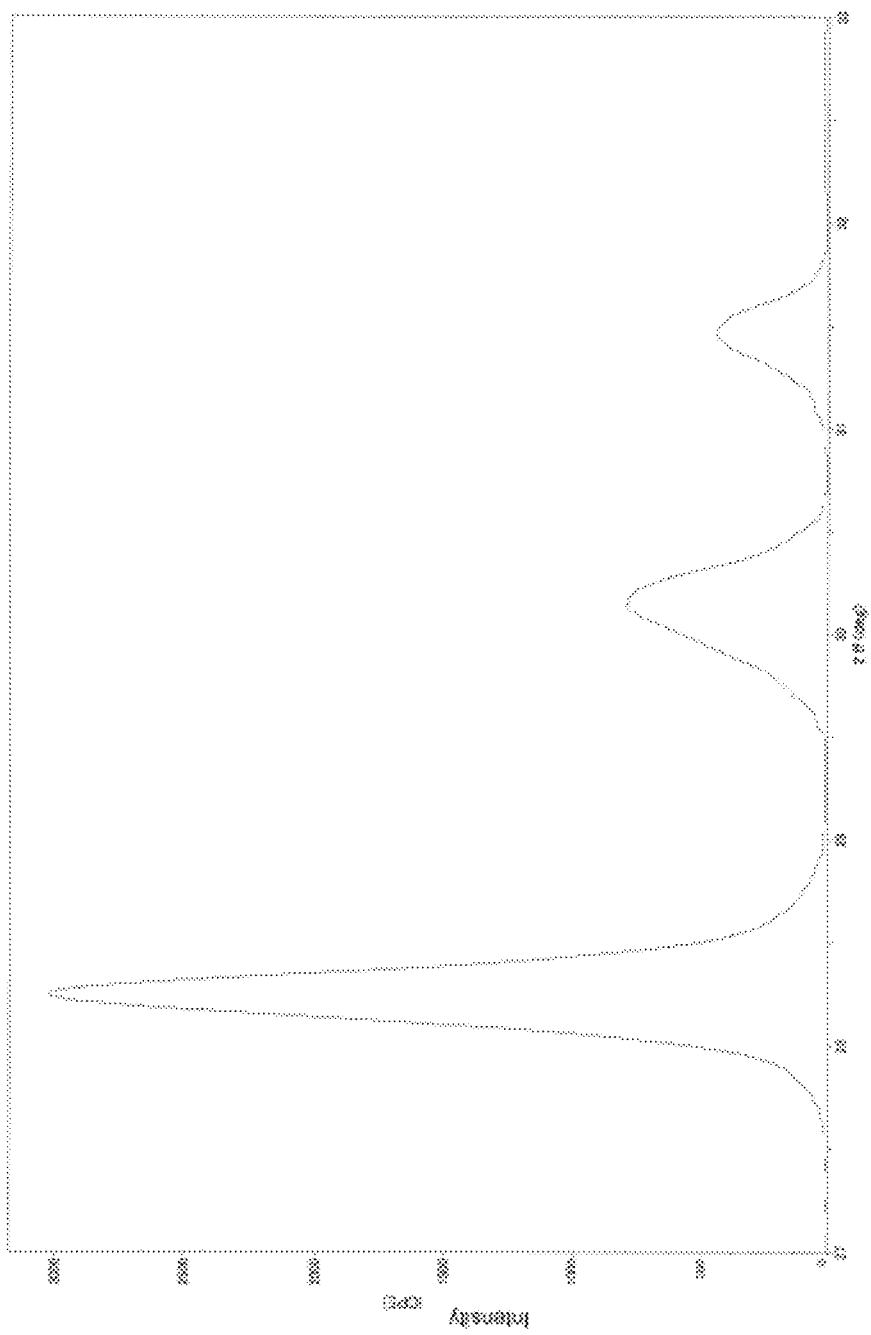
FIG. 7 is an X-ray diffraction pattern of a sintered body after hydrothermal treatment, made in Comparison 2.

FIGS. 4-7 illustrate a part of the X-ray diffraction patterns of the zirconia sintered bodies made in Example 4 and Comparison 2. FIG. 4 is the X-ray diffraction pattern of the zirconia sintered body, made in Example 4, before the hydrothermal treatment, and FIG. 5 is the X-ray diffraction pattern of the zirconia sintered body, made in Example 4, after the hydrothermal treatment. FIG. 6 is the X-ray diffraction pattern of the zirconia sintered body, made in Comparison 2, before the hydrothermal treatment, and FIG. 7 is the X-ray diffraction pattern of the zirconia sintered body, made in Comparison 2, after the hydrothermal treatment. These sintered bodies were burned at a temperature of 1550 degrees Celsius. According to the X-ray diffraction patterns of Comparison 2, in which no group 15 element was added and the content of silicon dioxide was low, FIG. 6 of before the hydrothermal treatment showed a peak at about 30.3° of 2θ where a tetragonal [111] peak is considered to appear, but hardly any peak that is considered to correspond to a monoclinic peak, and FIG. 7 of after the hydrothermal treatment showed a reduced (diminished) peak at about 30.3° of 2θ, and growths of peaks that are considered to correspond to a monoclinic [11-1] peak at about 28.3° of 2θ and a monoclinic [111] peak at about 31.5° of 2θ. On the other hand, according to the X-ray diffraction patterns of Example 4, in which the group 15 element was added and the content of silicon dioxide was high, FIG. 4 of before the hydrothermal treatment showed, in the same manner as comparison 2, a peak at about 30.3° of 2θ where a tetragonal [111] peak is considered to appear, but hardly any peak that is considered to correspond to the monoclinic peak, and, however, FIG. 5 of after the hydrothermal treatment showed no growth of the peaks that are considered to correspond to the monoclinic peaks at about 28.3° and 31.5° of 2θ, and the X-ray diffraction pattern after the hydrothermal treatment was almost same as the X-ray diffraction pattern before the hydrothermal treatment. In the prevent invention, the degree of the progress of the phase transition can be confirmed by measuring the X-ray pattern of the surface of the sintered body.

When Example 48 is compared with other examples, there is probability that the phase transition inhibitive effect is possible to be improved if alumina is further added in addition to the group 15 element, or the group 15 element and silicon dioxide.

TABLE 1

|  | Phosphorus Additive | Content of Phosphorus/ mass % | Content of Silicon Dioxide/ mass % | Binder |
|---|---|---|---|---|
| Example 1 | Phosphoric Acid | 0.1 | 0.1 | No Addition |
| Example 2 |  | 0.2 |  |  |
| Example 3 |  | 0.3 |  |  |
| Example 4 |  | 0.4 |  |  |

TABLE 1-continued

|  | Phosphorus Additive | Content of Phosphorus/ mass % | Content of Silicon Dioxide/ mass % | Binder |
|---|---|---|---|---|
| Example 5 |  | 0.5 |  |  |
| Example 6 |  | 0.1 |  | Acrylic Type |
| Example 7 |  | 0.2 |  |  |
| Example 8 |  | 0.3 |  |  |
| Example 9 |  | 0.4 |  |  |

TABLE 2

|  | Phosphorus Additive | Content of Phosphorus/ mass % | Content of Silicon Dioxide/ mass % | Binder |
|---|---|---|---|---|
| Example 10 | Aluminum Phosphate | 0.4 | 0.1 | Acrylic Type |
| Example 11 |  | 0.01 |  | No Addition |
| Example 12 |  | 0.1 |  |  |
| Example 13 |  | 0.2 |  |  |
| Example 14 |  | 0.3 |  |  |
| Example 15 |  | 0.4 |  |  |
| Example 16 |  | 0.5 |  |  |
| Example 17 |  | 0.6 |  |  |
| Example 18 |  | 0.8 |  |  |
| Example 19 |  | 1 |  |  |

TABLE 3

|  | Phosphorus Additive | Content of Phosphorus/ mass % | Content of Silicon Dioxide/ mass % | Binder |
|---|---|---|---|---|
| Example 20 | Magnesium Dihydrogen-phosphate | 0.1 | 0.1 | No Addition |
| Example 21 |  | 0.2 |  |  |
| Example 22 |  | 0.3 |  |  |
| Example 23 |  | 0.4 |  |  |
| Example 24 |  | 0.5 |  |  |

TABLE 4

|  | Phosphorus Additive | Content of Phosphorus/ mass % | Content of Silicon Dioxide/ mass % | Binder |
|---|---|---|---|---|
| Example 25 | Ammonium Dihydrogen-phosphate | 0.1 | 0.1 | No Addition |
| Example 26 |  | 0.2 |  |  |
| Example 27 |  | 0.3 |  |  |
| Example 28 |  | 0.4 |  |  |
| Example 29 |  | 0.5 |  |  |

TABLE 5

|  | Phosphorus Additive | Content of Phosphorus/ mass % | Content of Silicon Dioxide/ mass % | Binder |
|---|---|---|---|---|
| Example 30 | Calcium Hydrogen-phosphate | 0.1 | 0.1 | No Addition |
| Example 31 |  | 0.5 |  |  |

TABLE 6

| | Phosphorus Additive | Content of Phosphorus/ mass % | Content of Silicon Dioxide/ mass % | Binder |
|---|---|---|---|---|
| Example 32 | Magnesium | 0.1 | 0.1 | No Addition |
| Example 33 | Hydrogen- | 0.2 | | |
| Example 34 | phosphate | 0.3 | | |

TABLE 7

| | Phosphorus Additive | Content of Phosphorus/ mass % | Content of Silicon Dioxide/ mass % | Binder |
|---|---|---|---|---|
| Example 35 | Phosphoric Acid | 0.1 | ≤0.02 | No Addition |

TABLE 8

| | Phosphorus Additive | Content of Phosphorus/ mass % | Content of Silicon Dioxide/ mass % | Binder |
|---|---|---|---|---|
| Example 36 | Aluminum | 0.1 | ≤0.02 | No Addition |
| Example 37 | Phosphate | 0.4 | | |

TABLE 9

| | Phosphorus Additive | Content of Phosphorus/ mass % | Content of Silicon Dioxide/ mass % | Binder |
|---|---|---|---|---|
| Example 38 | Magnesium | 0.1 | ≤0.02 | No Addition |
| Example 39 | Dihydrogen- | 0.2 | | |
| Example 40 | phosphate | 0.3 | | |
| Example 41 | | 0.4 | | |

TABLE 10

| | Phosphorus Additive | Content of Phosphorus/ mass % | Content of Silicon Dioxide/ mass % | Binder |
|---|---|---|---|---|
| Example 42 | Magnesium | 0.1 | ≤0.02 | No Addition |
| Example 43 | Hydrogen- | 0.2 | | |
| Example 44 | phosphate | 0.3 | | |
| Example 45 | | 0.4 | | |
| Example 46 | | 0.5 | | |

TABLE 11

| | Phosphorus Additive | Content of Phosphorus/ mass % | Content of Silicon Dioxide/ mass % | Binder |
|---|---|---|---|---|
| Example 47 | Phosphoric Acid | 0.4 | ≤0.02 | No Addition |
| Example 48 | Aluminum Phosphate | 0.4 | | |

TABLE 12

| | Phosphorus Additive | Content of Phosphorus/ mass % | Content of Silicon Dioxide/ mass % | Binder |
|---|---|---|---|---|
| Comparison 1 | No Addition | | 0.1 | No Addition |
| Comparison 2 | | | ≤0.02 | |
| Comparison 3 | | | ≤0.02 | |
| Comparison 4 | | | ≤0.02 | |

TABLE 13

| | Burning Temperature | | | | | | |
|---|---|---|---|---|---|---|---|
| | 1400 | 1450 | 1500 | 1525 | 1550 | 1600 | 1650 |
| Example 1 | 42 | 100 | 93 | 52 | 22 | 1 | 1 |
| Example 2 | 48 | | 71 | 35 | 5 | 1 | 1 |
| Example 3 | 54 | | 55 | 26 | 2 | 1 | 2 |
| Example 4 | 48 | | 61 | 22 | 1 | 1 | 0 |
| Example 5 | 50 | 69 | 71 | 22 | 2 | 1 | 1 |
| Example 6 | 58 | | 108 | 69 | 48 | 0 | 1 |
| Example 7 | 59 | | 90 | 50 | 20 | 0 | 1 |
| Example 8 | 64 | | 77 | 33 | 3 | 0 | 0 |
| Example 9 | 65 | | 41 | 1 | 1 | 0 | 1 |
| Comparison 1 | 40 | 106 | 195 | 209 | 190 | 178 | 164 |

TABLE 14

| | Burning Temperature | | | | | | |
|---|---|---|---|---|---|---|---|
| | 1400 | 1450 | 1500 | 1525 | 1550 | 1600 | 1650 |
| Example 10 | 69 | | 31 | 1 | 0 | 1 | 0 |
| Example 11 | 38 | | 162 | 166 | 145 | 109 | 80 |
| Example 12 | 31 | 124 | 86 | 59 | 17 | 0 | 0 |
| Example 13 | 40 | 223 | 69 | 30 | 1 | 0 | 0 |
| Example 14 | 62 | | 56 | 23 | 1 | 1 | 0 |
| Example 15 | 65 | 99 | 35 | 16 | 1 | 1 | 1 |
| Example 16 | 77 | | 50 | 6 | 1 | 2 | 1 |
| Example 17 | | 75 | 44 | 13 | 3 | 1 | 1 |
| Example 18 | | 175 | 53 | 21 | 17 | 3 | 1 |
| Example 19 | | | 71 | 39 | 29 | 24 | 1 |
| Comparison 1 | 40 | 106 | 195 | 209 | 190 | 178 | 164 |

TABLE 15

| | Burning Temperature | | | | | | |
|---|---|---|---|---|---|---|---|
| | 1400 | 1450 | 1500 | 1525 | 1550 | 1600 | 1650 |
| Example 20 | | | 57 | 24 | 6 | 1 | |
| Example 21 | | 89 | 24 | 1 | 2 | 1 | |
| Example 22 | | | 7 | 3 | 3 | 2 | |
| Example 23 | | | 10 | 1 | 1 | 0 | |
| Example 24 | | | | 5 | 1 | | |
| Comparison 1 | 40 | 106 | 195 | 209 | 190 | 178 | 164 |

TABLE 16

| | Burning Temperature | | | | | | |
|---|---|---|---|---|---|---|---|
| | 1400 | 1450 | 1500 | 1525 | 1550 | 1600 | 1650 |
| Example 25 | | | 107 | 62 | 29 | 2 | |
| Example 26 | | | 86 | 37 | 13 | 1 | |
| Example 27 | | | 77 | 26 | 2 | 0 | |
| Example 28 | | | 65 | 17 | 1 | 1 | |
| Example 29 | | | x | 8 | | | |
| Comparison 1 | 40 | 106 | 195 | 209 | 190 | 178 | 164 |

TABLE 17

| | Burning Temperature | | | | | | |
|---|---|---|---|---|---|---|---|
| | 1400 | 1450 | 1500 | 1525 | 1550 | 1600 | 1650 |
| Example 30 | 90 | | 62 | 28 | 13 | 2 | 2 |
| Example 31 | 91 | | 134 | 208 | 49 | 27 | 17 |
| Comparison 1 | 40 | 106 | 195 | 209 | 190 | 178 | 164 |

TABLE 18

| | Burning Temperature | | | | | | |
|---|---|---|---|---|---|---|---|
| | 1400 | 1450 | 1500 | 1525 | 1550 | 1600 | 1650 |
| Example 32 | | | 53 | 32 | 8 | 6 | |
| Example 33 | | | 94 | 81 | 26 | 4 | |
| Example 34 | | 89 | 283 | 159 | 54 | 39 | |
| Comparison 1 | 40 | 106 | 195 | 209 | 190 | 178 | 164 |

TABLE 19

| | Burning Temperature | | | | | | |
|---|---|---|---|---|---|---|---|
| | 1400 | 1450 | 1500 | 1525 | 1550 | 1600 | 1650 |
| Example 35 | 7 | 236 | 287 | x | 166 | 49 | 8 |
| Comparison 2 | 6 | 455 | 422 | 388 | 372 | 347 | 217 |

TABLE 20

| | Burning Temperature | | | | | | |
|---|---|---|---|---|---|---|---|
| | 1400 | 1450 | 1500 | 1525 | 1550 | 1600 | 1650 |
| Example 36 | | 351 | 360 | x | 273 | x | 0 |
| Example 37 | x | x | x | 233 | 191 | 1 | x |
| Comparison 2 | 6 | 455 | 422 | 388 | 372 | 347 | 217 |

TABLE 21

| | Burning Temperature | | | | | | |
|---|---|---|---|---|---|---|---|
| | 1400 | 1450 | 1500 | 1525 | 1550 | 1600 | 1650 |
| Example 38 | | 51 | 87 | 64 | 47 | 5 | |
| Example 39 | | 28 | 24 | 9 | 4 | 1 | |
| Example 40 | | 41 | 12 | 1 | 2 | 2 | |
| Example 41 | | | | | 2 | | |
| Comparison 2 | 6 | 455 | 422 | 388 | 372 | 347 | 217 |

TABLE 22

| | Burning Temperature | | | | | | |
|---|---|---|---|---|---|---|---|
| | 1400 | 1450 | 1500 | 1525 | 1550 | 1600 | 1650 |
| Example 42 | | 3 | 7 | 2 | 2 | 2 | |
| Example 43 | | 28 | 7 | 4 | 3 | 2 | |
| Example 44 | | 131 | 35 | 28 | 12 | 8 | |

TABLE 22-continued

| | Burning Temperature | | | | | | |
|---|---|---|---|---|---|---|---|
| | 1400 | 1450 | 1500 | 1525 | 1550 | 1600 | 1650 |
| Example 45 | | 213 | 98 | 61 | 38 | 18 | |
| Example 46 | | 275 | 97 | 83 | 60 | 33 | |
| Comparison 2 | 6 | 455 | 422 | 388 | 372 | 347 | 217 |

TABLE 23

| | Burning Temperature | | | | | | |
|---|---|---|---|---|---|---|---|
| | 1400 | 1450 | 1500 | 1525 | 1550 | 1600 | 1650 |
| Example 47 | | | | 249 | 163 | 104 | 35 |
| Comparison 3 | 2 | 463 | 431 | 347 | 355 | 218 | 205 |

TABLE 24

| | Burning Temperature | | | | | | |
|---|---|---|---|---|---|---|---|
| | 1400 | 1450 | 1500 | 1525 | 1550 | 1600 | 1650 |
| Example 48 | 60 | 340 | 248 | 187 | 204 | x | 10 |
| Comparison 4 | 1 | | 505 | 407 | 410 | 382 | 207 |

Example 49

Strength Measurement Test

A flexural strength test was performed on the zirconia sintered body of the present invention. Measuring samples of Example 49 were the test pieces of Example 9 burned at the temperature of 1550 degrees Celsius for 2 hours, with the proviso that the CIP treatment was applied to the compacts for the measuring samples of Example 49, the compact had a size of 65 mm×33 mm×7.5 mm after the shaping. As Comparison 5, the flexural strength test was performed to test pieces including no phosphorus, that were made by adding the acrylic binder to the samples of Comparison 2 in the same way as Example 9 and burning them at the temperature of 1550 degrees Celsius for 2 hours. The flexural strength test was performed in conformity with JISR1601. The strength test was performed four times each sample, and the average value was calculated. Test results are shown in Table 25 (measurement values of Comparison 5 are omitted).

When Example 49 is compared with Comparison 5, even if the group 15 element is included in the zirconia sintered body or even if the content of silicon dioxide is high, a decrease in the flexural strength of the zirconia sintered body is not observed. According to the present invention, the zirconia sintered body in which the progress of the phase transition is inhibited without decreasing the flexural strength can be obtained.

TABLE 25

| | Composition of Sample | P/ mass % | SiO$_2$/ mass % | Burning Temperature/° C. | Flexural Strength/ MPa | Average Flexural Strength/MPa |
|---|---|---|---|---|---|---|
| Example 49 | Example 9 | 0.4 | 0.1 | 1550 | 1121.6 1309.9 1331.1 1149.6 | 1228 |
| Comparison 5 | Comparison 2 | No Addition | ≤0.02 | 1550 | | 1143 |

Example 50

Fracture Toughness Measurement Test

A fracture toughness test was performed on the zirconia sintered body of the present invention. Measuring samples of Example 50 were the sintered body which was the test piece of Example 9 burned at the temperature of 1550 degrees Celsius for 2 hours in the same way as Example 49. As Comparison 6, the fracture toughness test was performed on test pieces including no phosphorus, that were made by adding the acrylic binder to the samples of Comparison 2 in the same way as Example 9 and burning them at the temperature of 1550 degrees Celsius for 2 hours. The fracture toughness test was performed in conformity with JISR1607. Test results are shown in Table 26.

When Example 50 is compared with Comparison 6, even if the group 15 element is included, or even if the content of silicon dioxide is high, it is found that a decrease in the fracture toughness of the zirconia sintered body is not observed (the example could rather obtain higher fracture toughness than the comparison). Therefore, according to the present invention, the zirconia sintered body in which the progress of the phase transition is inhibited can be obtained without decreasing the fracture toughness.

TABLE 26

| | Composition of Sample | P/mass % | $SiO_2$/mass % | Burning Temperature/°C. | Fracture Toughness/$MPa \cdot m^{1/2}$ |
|---|---|---|---|---|---|
| Example 50 | Example 9 | 0.4 | 0.1 | 1550 | 6.4 |
| Comparison 6 | Comparison 2 | No Addition | ≤0.02 | 1550 | 4.0 |

Example 51

Measuring Test of Change in Peak Ratio Affected by Time of Hydrothermal Treatment The changes of the peak ratios after the hydrothermal treatment were measured each different time of the hydrothermal treatment. Measuring samples of Example 51 were the sintered body which was the test piece of Example 9 burned at the temperature of 1550 degrees Celsius for 2 hours. As measuring samples of Comparison 7 in which no group 15 element was included and the content of silicon dioxide was low, peak ratios of the sintered body were also measured, which was made using the partially-stabilized tetragonal zirconia powder (made by Tosoh Corporation; Product number TZ-3Y-E) including 5.2±0.5 mass % (3 mol %) of yttrium oxide, 0.02 mass % or less of silicon dioxide, and 0.1 mass % to 0.4 mass % of alumina (Product Standard Values) in a crystal particle. The samples of Comparison 7 included the binder of the acrylic type and were burned at the temperature of 1550 degrees Celsius for 2 hours in a same way as Example 51. The method of the hydrothermal treatment was same as that in Examples 1-48 other than the time of the hydrothermal treatment, and peak ratios of the samples with different times of the hydrothermal treatment were calculated. The method of calculating the peak ratio was same as Tables 13-24. The test results are shown in Table 27.

Figure 8:
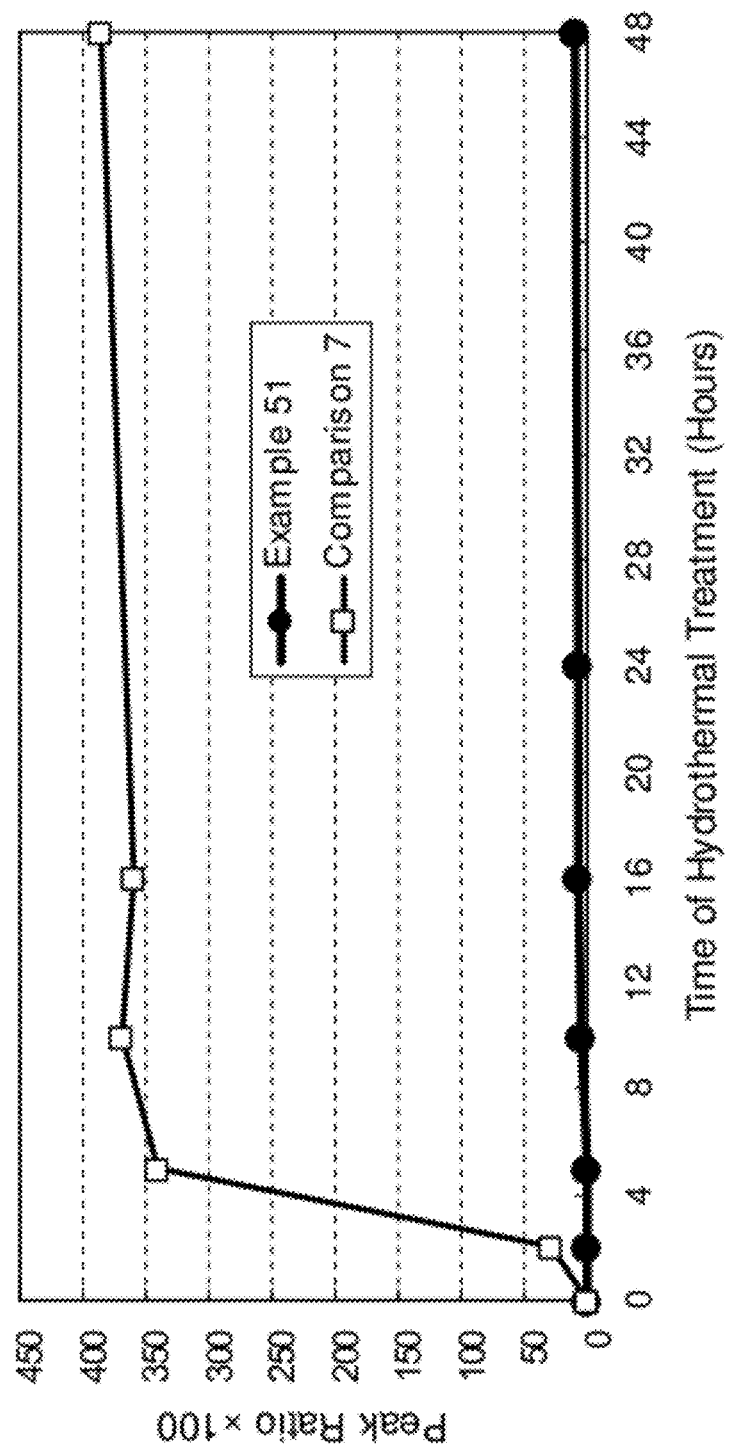
FIG. 8 is a graph to compare Example 51 in Table 27 with Comparison 7.

FIG. 8 shows a graph comparing Example 51 with Comparison 7. In Example 51, even if the hydrothermal treatment was applied for 48 hours, the peak ratio was 0.1 (the values in Table 27 are values multiplied by one hundred times). On the other hand, in Comparison 7, by the hydrothermal treatment for 5 hours, the peak ratio was 3 or more. Therefore, it is found that the zirconia sintered body of the present invention can inhibit the phase transition even if the hydrothermal treatment is applied for long hours. That is, it is found that the zirconia sintered body of the present invention has long-term stability.

TABLE 27

| | Time of Thermal Treatment/Hours | | | | | | |
|---|---|---|---|---|---|---|---|
| | 0 | 2 | 5 | 10 | 16 | 24 | 48 |
| Example 51 | 0 | 0 | 1 | 5 | 6 | 8 | 10 |
| Comparison 7 | 0 | 29 | 340 | 370 | 360 | | 386 |

Example 52

Strength Measurement Test after Hydrothermal Treatment

A test of measuring the flexural strength after the hydrothermal treatment was performed on the zirconia sintered body of the present invention. On each sample in Example 51 and Comparison 7, the hydrothermal treatment was performed with different times of the hydrothermal treatment and the change of the flexural strength was measured. The tests are designated as Example 52 and Comparison 8. The test piece had the size of 4 mm×25 mm×0.2 mm. The flexural strength test was conformed to JISR1601 except for the size of the test piece. The test results are shown in Tables 28 and 29. The unit of the flexural strength in Tables 28 and 29 is MPa.

Figure 9:
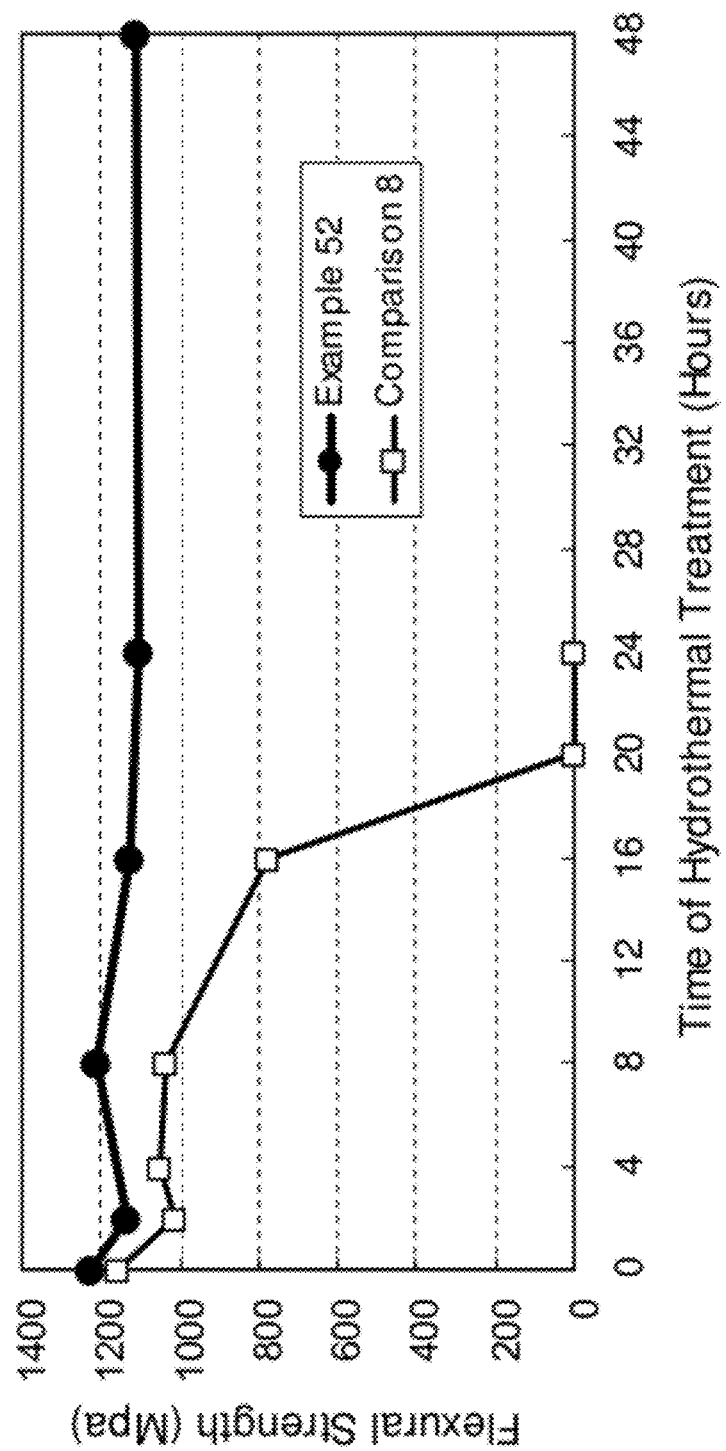
FIG. 9 is a graph to compare Example 52 in Tables 28 and 29 with Comparison 8.

FIG. 9 shows a graph that compares Example 52 with Comparison 8. In Example 52, even if the hydrothermal treatment was applied for 48 hours, the flexural strength was almost same as that before the hydrothermal treatment and could be kept 1,100 MPa or more. On the other hand, in Comparison 8, when the time of the hydrothermal treatment was over 8 hours, the flexural strength greatly decreased, and the test pieces of 20 hours and 24 hours of the hydrothermal treatment showed a strength that was tantamount to merely maintain the original shapes and were very brittle. Therefore, it is found that the zirconia sintered body of the present invention can keep the flexural strength even if the hydrothermal treatment is performed for long hours. That is, it is found that the zirconia sintered body of the present invention has long-term stability.

TABLE 28

| | Time of Thermal Treatment/Hours | | | |
|---|---|---|---|---|
| | 0 | 2 | 4 | 8 |
| Example 52 | 1228 | 1133 | | 1213 |
| Comparison 8 | 1159 | 1010 | 1052 | 1035 |

TABLE 29

| | Time of Thermal Treatment/Hours | | | |
|---|---|---|---|---|
| | 16 | 20 | 24 | 48 |
| Example 52 | 1125 | | 1100 | 1112 |
| Comparison 8 | 777 | 0 | 0 | |

Example 53

Size Change Measurement Test after Hydrothermal Treatment

Size changes of the zirconia sintered body of the present invention after the hydrothermal treatment were measured. On each sample in Example 51 and Comparison 7, the hydrothermal treatment was performed with different times of the hydrothermal treatment and the width of the test piece was measured. The tests are designated as Example 53 and Comparison 9. The test pieces to which the hydrothermal treatment was applied were made in conformity with JISR1601. The test results are shown in Table 30. The unit of the values in Table 30 is mm.

Figure 10:
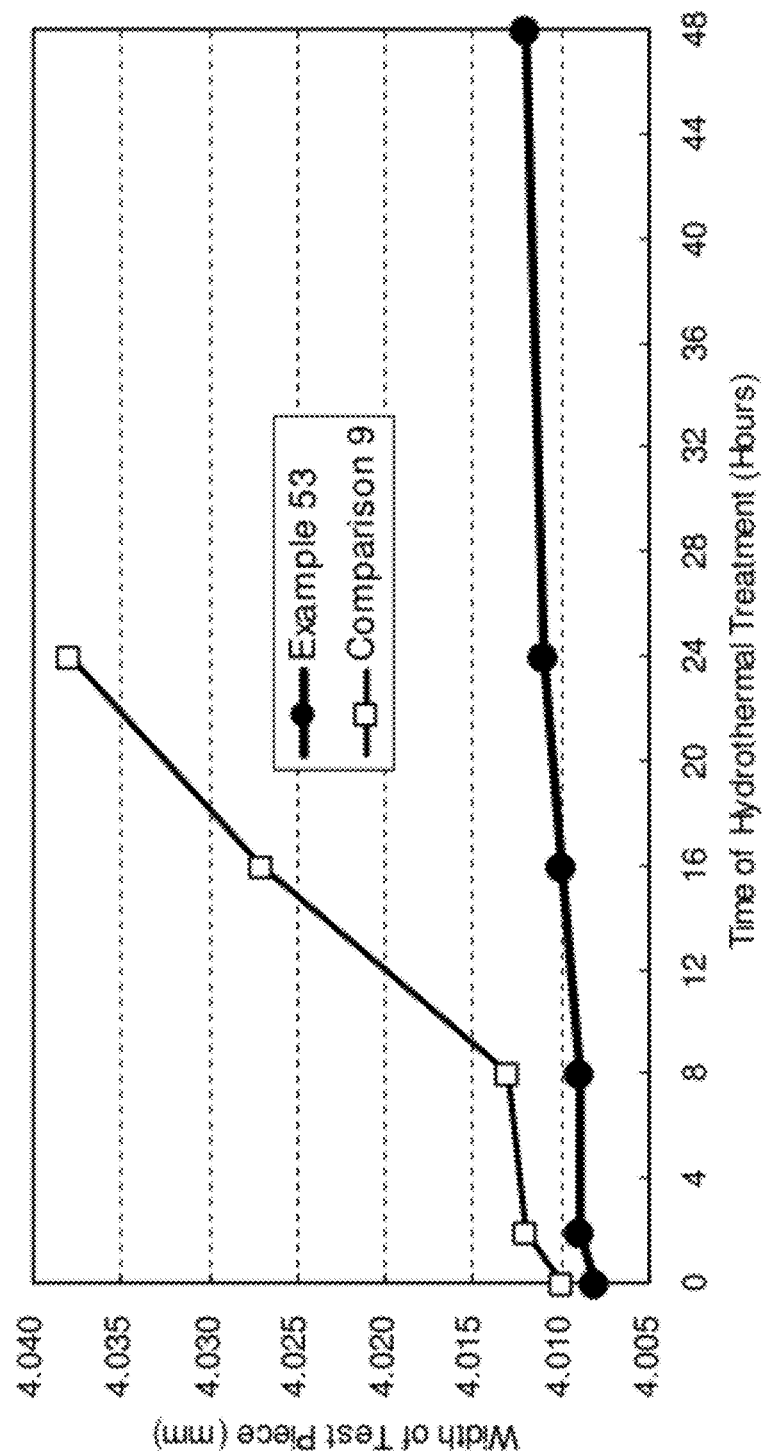
FIG. 10 is a graph to compare Example 53 in Table 30 with Comparison 9.

FIG. 10 shows a graph that compares Example 53 with Comparison 9. In Example 53, even if the hydrothermal treatment was applied for 48 hours, the sizes showed no remarkable change, and the size after 48 hours of the hydrothermal treatment showed only about 0.1% expansion compared with before the hydrothermal treatment. On the other hand, in Comparison 9, the size for 8 hours of the hydrothermal treatment showed expansion of about 0.07% as compared with before the hydrothermal treatment. When the time of the hydrothermal treatment was over 8 hours, the size rapidly swelled, and the size for 24 hours of the hydrothermal treatment largely swelled by about 0.7% as compared with before the hydrothermal treatment. Therefore, it is found that the zirconia sintered body of the present invention can keep high size precision even if the hydrothermal treatment is performed for long hours. That is, it is found that the zirconia sintered body of the present invention has long-term stability.

TABLE 30

| | Time of Thermal Treatment/Hours | | | | | |
|---|---|---|---|---|---|---|
| | 0 | 2 | 8 | 16 | 24 | 48 |
| Example 53 | 4.008 | 4.009 | 4.009 | 4.010 | 4.011 | 4.012 |
| Comparison 9 | 4.010 | 4.012 | 4.013 | 4.027 | 4.038 | |

Examples 54-55

Measuring Contents of Phosphorus and Silicon Dioxide Before and after Burning Tests that confirm whether phosphorus (Example 54) and silicon dioxide (Example 55) included before the burning of the compact remain in the sintered body after the burning were performed. On the mixture before shaping (compacting) for the test piece of Example 9 (mixture of zirconia powder, phosphoric acid and binder) and the test piece of Example 9 (the sintered body made by burning the shaped mixture at the temperature of 1550 degrees Celsius), the content of phosphorus (P) and the content of silicon (Si) were measured. After each sample was dissolved, the measurement was performed using emission spectroscopic analyzer (SII Nano-Technology Inc.; Product Number SPS4000) (by Toray Research Center, Inc.). The measurement was performed two times including pretreatment of the sample. The measurement results of phosphorus are shown in Table 31, and the measurement results of silicon are shown in Table 32.

In the test piece of Example 9, although phosphorus was added 0.4 mass % to the zirconia powder when the mixture was made, similar contents were measured both before and after the burning. Although 0.1 mass % of silicon dioxide (0.047 mass % if converted to silicon) was included in the zirconia particle, similar contents were measured both before and after the burning. Therefore, it is found that the addition rates and contents of phosphorus and silicon in the mixture can be regarded as the contents in the sintered body. Although the contents of both phosphorus and silicon after the burning are higher than those before the burning, it is considered that dissipation of the binder and the like caused by the burning increases the content percentage after the burning.

TABLE 31

| | | Content of Phosphorus/mass % | |
|---|---|---|---|
| | | Before Burning (Mixture) | After Burning (Sintered body) |
| Example 54 | First | 0.36 | 0.38 |
| | Second | 0.36 | 0.36 |
| | Average | 0.36 | 0.37 |

TABLE 32

| | | Content of Silicon/mass % | |
|---|---|---|---|
| | | Before Burning (Mixture) | After Burning (Sintered body) |
| Example 55 | First | 0.043 | 0.048 |
| | Second | 0.045 | 0.048 |
| | Average | 0.044 | 0.048 |

Examples 56-57

Test Using Organic Compound as Compound Including Phosphorus

In Examples 1-48, although the inorganic compounds were used as the compounds including phosphorus, the zirconia sintered bodies to which the organic compounds including phosphorus were added instead of the inorganic compounds were made, and it was confirmed whether similar effects were obtainable. The used organic compounds including phosphorus were Bis(2,4,6-Trimethylbenzoyl)-phenylphosphine oxide (made by Chiba Japan; Product number IRGACURE819) in Example 56, and 2,4,6-Trimethylbenzoyl-diphenyl-phosphine oxide (made by Chiba Japan; Product number DAROCUR TPO) in Example 57. In Comparison 10, the zirconia sintered body to which 2,2-dimethozy-1,2-diphenylethane-1-one (made by Chiba Japan; Product number IRGACURE651) was added as an organic compound including no phosphorus was made, and the same test was performed.

8 g of the partially-stabilized zirconia powder (made by Noritake Co., Ltd.) used in Examples 1-34 and 0.1 g of the organic compound were mixed in 10 g of acetone, and then acetone was removed with an oven to obtain the mixtures. Then, the zirconia sintered bodies were made in the same way as Examples 1-48, and the hydrothermal treatment was applied. The burning condition was at the temperature of 1550 degrees Celsius for 1.5 hours. Table 33 shows peak ratios after the hydrothermal treatment. Phosphorus addition ratio was mass (weight) percentage of the phosphorus element to the zirconia powder. The calculation method of the peak ratio was same as Tables 13-24.

In Comparison 10, the phase transition occurs, whereas, in Examples 56 and 57, it is found that the phase transition can be inhibited. Therefore, it is found that the compound including the group 15 element to add the group 15 element to the zirconia sintered body is not limited to the inorganic compound, and the organic compound may be used.

TABLE 33

| | P Addition Rate/ mass % | Molar Number to 1 mol of $ZrO_2$ | $SiO_2$ Addition Rate/ mass % | Peak Ratio × 100 |
|---|---|---|---|---|
| Example 56 | 0.091 | $3.9 \times 10^{-3}$ | 0.1 | 0 |
| Example 57 | 0.11 | $4.7 \times 10^{-3}$ | 0.1 | 0 |
| Comparison 10 | | $6.4 \times 10^{-3}$ | 0.1 | 190 |

Examples 58-63

Tests Using Group 15 Elements Other than Phosphorus

Although, in Examples 1-57, phosphorus was used as the group 15 element, it was confirmed whether the group 15 elements other than phosphorus have an effect on the phase transition inhibition. Antimony (Sb) and bismuth (Bi) were used as the group 15 elements other than phosphorus.

To the partially-stabilized zirconia powder used in Examples 1-34 (made by Noritake Co., Ltd.), antimony oxide ($Sb_2O_5$) was added in Examples 58-60 so that the content of the antimony element was equal to the addition rates in Table 34, and bismuth trioxide ($Bi_2O_3$) was added in Examples 61-63 so that the content of the bismuth element was equal to the addition rates in Table 34, and the zirconia sintered bodies were made in same way as Examples 1-48, respectively, by burning the compacts at the temperature shown in Table 34 for 2 hours. The hydrothermal treatment was applied to each made zirconia sintered body in same way as Examples 1-48, and the peak ratios after the hydrothermal treatment were calculated. The calculation method of the peak ratios is same as Tables 13-24. As Comparison 11, the zirconia sintered body to which no group 15 element was added was made, and the peak ratio was measured. Table 34 shows test results.

Examples 58-63 can inhibit the phase transition to the monoclinic system as compared with Comparison 11. Therefore, antimony and bismuth also have the effect on the inhibition of the phase transition. According to Examples 59-60 and Examples 62-63, especially, when the contents of the antimony element and(or) bismuth element are 1.0 mass % and 5.0 mass %, the high phase transition inhibitive effect can be obtained.

Since phosphorus, antimony and bismuth belong to the group 15 elements, it is conjectured that arsenic (As) that is located between phosphorus and antimony in the group 15 has an effect on the inhibition of the phase transition. Accordingly, if arsenic, antimony and(or) bismuth be added to the zirconia sintered body, it is considered that the effect same as the above examples to which phosphorus is added can be also obtained.

TABLE 34

| | Additives | Addition Rate/ mass % | Molar Number to 1 mol of $ZrO_2$ | Burning Temperature/ °C. | Peak Ratio × 100 |
|---|---|---|---|---|---|
| Example 58 | Antimony | 0.1 | $1.1 \times 10^{-3}$ | 1650 | 81.7 |
| Example 59 | Oxide | 1.0 | $1.1 \times 10^{-2}$ | 1600 | 1 |

TABLE 34-continued

| | Additives | Addition Rate/ mass % | Molar Number to 1 mol of $ZrO_2$ | Burning Temperature/ °C. | Peak Ratio × 100 |
|---|---|---|---|---|---|
| Example 60 | | 5.0 | $5.4 \times 10^{-2}$ | | 1 |
| Example 61 | Bismuth | 0.1 | $6.2 \times 10^{-4}$ | 1650 | 124 |
| Example 62 | Trioxide | 1.0 | $6.2 \times 10^{-3}$ | 1600 | 1 |
| Example 63 | | 5.0 | $3.1 \times 10^{-2}$ | | 2 |
| Comparison 11 | | No Addition | | 1650 | 147 |

Examples 64-106

Tests on Content of Silicon Dioxide

In Examples 1-34, the content of silicon dioxide was fixed to 0.1 mass %. The zirconia sintered bodies that were different in the content of silicon dioxide were made, and the phase transition inhibitive effect was confirmed.

To the partially-stabilized zirconia powder used in Examples 35-46 (made by Tosoh Corporation; Product number TZ-3Y-E; content of $SiO_2$ 0.02 mass % or less (Product standard value)), phosphoric acid and silicon dioxide were added so that the contents of the phosphorus element and silicon dioxide were equal to the addition rates shown in Tables 35 and 36, and the zirconia sintered bodies were made in same way as Examples 1-48, by burning the compacts at the temperature of 1550 degrees Celsius for 1.5 hours. The hydrothermal treatment was applied to each made zirconia sintered body in same way as Examples 1-48, and the peak ratios after the hydrothermal treatment were calculated. The calculation method of the peak ratios is same as Tables 13-24. As Comparison 12, the zirconia sintered body to which any compound including phosphorus and silicon dioxide were not added was made, and the peak ratio was measured. Tables 35 and 36 show test results. Tables 35 and 36 also show the result of Comparison 1.

Although, in the examples to which silicon dioxide was not added, the peak ratio was high, and the sintered bodies were broken, these were improved when silicon dioxide was added. Therefore, if silicon dioxide in addition to the group 15 element is added to the zirconia sintered body, it is found that the phase transition inhibitive effect can be enhanced.

According to Examples 69-106, especially, when the content of phosphorus was 0.01 mass % to 1 mass % (as the group 15 element, $4 \times 10^{-4}$ mol to $4 \times 10^{-2}$ mol to 1 mol of zirconium oxide (IV)) and the content of silicon dioxide was 0.03 mass % to 3 mass %, the peak ratios could decrease than Comparison 9. When the content of silicon dioxide was 0.05 mass % to 1 mass %, the peak ratios could further decrease, and when the content of silicon dioxide was 0.1 mass % to 0.8 mass %, the peak ratios could further decrease.

TABLE 35

| | Content of Silicon Dioxide/mass % | Content of Phosphorus/mass % | Peak Ratio × 100 |
|---|---|---|---|
| Example 64 | 0 | 0.1 | 156 |
| Example 65 | 0 | 0.2 | x |
| Example 66 | 0 | 0.3 | x |
| Example 67 | 0 | 0.4 | x |
| Example 68 | 0 | 0.5 | x |
| Example 69 | 0.03 | 0.4 | 140 |
| Example 70 | 0.05 | 0.4 | 78 |
| Example 71 | 0.1 | 0.001 | 191 |

TABLE 35-continued

| | Content of Silicon Dioxide/mass % | Content of Phosphorus/mass % | Peak Ratio × 100 |
|---|---|---|---|
| Example 72 | 0.1 | 0.01 | 145 |
| Example 73 | 0.1 | 0.1 | 22 |
| Example 74 | 0.1 | 0.2 | 5 |
| Example 75 | 0.1 | 0.3 | 2 |
| Example 76 | 0.1 | 0.4 | 1 |
| Example 77 | 0.1 | 0.5 | 2 |
| Example 78 | 0.1 | 0.6 | 3 |
| Example 79 | 0.1 | 0.8 | 17 |
| Example 80 | 0.1 | 1 | 29 |
| Example 81 | 0.2 | 0.1 | 59 |
| Example 82 | 0.2 | 0.2 | 4 |
| Example 83 | 0.2 | 0.4 | 1 |
| Example 84 | 0.3 | 0.1 | 46 |
| Comparison 1 | 0.1 | No Addition | 190 |
| Comparison 12 | No Addition | No Addition | 356 |

TABLE 36

| | Content of Silicon Dioxide/mass % | Content of Phosphorus/mass % | Peak Ratio × 100 |
|---|---|---|---|
| Example 85 | 0.3 | 0.3 | 2 |
| Example 86 | 0.3 | 0.4 | 2 |
| Example 87 | 0.3 | 0.6 | 2 |
| Example 88 | 0.3 | 0.8 | 14 |
| Example 89 | 0.4 | 0.1 | 49 |
| Example 90 | 0.4 | 0.2 | 5 |
| Example 91 | 0.4 | 0.4 | 2 |
| Example 92 | 0.5 | 0.1 | 63 |
| Example 93 | 0.5 | 0.2 | 38 |
| Example 94 | 0.5 | 0.3 | 6 |
| Example 95 | 0.5 | 0.4 | 4 |
| Example 96 | 0.5 | 0.5 | 2 |
| Example 97 | 0.5 | 0.7 | 17 |
| Example 98 | 0.5 | 1 | 52 |
| Example 99 | 0.6 | 0.4 | 7 |
| Example 100 | 0.7 | 0.2 | 31 |
| Example 101 | 0.7 | 0.7 | 29 |
| Example 102 | 0.8 | 0.3 | 20 |
| Example 103 | 0.8 | 0.4 | 23 |
| Example 104 | 0.9 | 0.2 | 49 |
| Example 105 | 1 | 0.1 | 86 |
| Example 106 | 3 | 0.1 | 150 |
| Comparison 1 | 0.1 | No Addition | 190 |
| Comparison 12 | No Addition | No Addition | 356 |

Examples 107-110

Tests on Content of Yttrium Oxide

In above Examples, the tests were performed using the partially-stabilized zirconia including 3 mol % of yttrium oxide ($Y_2O_3$) as the stabilizing agent. It was confirmed whether the phase transition inhibitive effect was gotten even if the content of yttrium oxide was changed.

To the partially-stabilized zirconia powders (made by Noritake Co., Ltd.) that were different in the content of yttrium oxide, phosphoric acid was added so that the content of the phosphorus element was 0.4 mass %, the zirconia sintered bodies were made in same way as Examples 1-48, by burning the compact at the temperature of 1550 degrees Celsius for 1.5 hours. This partially-stabilized zirconia powder included 0.1 mass % of silicon dioxide. The hydrothermal treatment was applied to each made zirconia sintered body in same way as Examples 1-48, and the peak ratios after the hydrothermal treatment were calculated. The calculation method of the peak ratios was same as Tables 13-24. As Comparisons 13 and 14, the zirconia sintered body to which any compound including phosphorus was not added was made by the burning at the temperature of 1550 degrees Celsius, and the peak ratios were measured. Table 37 shows test results.

According to Examples 107-110, even if the content of yttrium oxide is changed, the phase transition inhibitive effect can be obtained. Therefore, it is found that the present invention can be applied to the partially-stabilized zirconia without being affected by the content of the stabilizing agent. In Example 110, it was presumed that, since stability was improved by increasing the content of yttrium oxide, the peak ratio became 0.

TABLE 37

| | Content of $Y_2O_3$/mol % | P Addition Rate/mass % | Content of $SiO_2$/mass % | Peak Ratio × 100 |
|---|---|---|---|---|
| Example 107 | 2.25 | 0.4 | 0.1 | 30 |
| Example 108 | 2.5 | | 0.1 | 1 |
| Example 109 | 4.0 | | 0.1 | 35 |
| Example 110 | 5.0 | | 0.1 | 0 |
| Comparison 13 | 2.25 | No Addition | 0.1 | 200 |
| Comparison 14 | 2.5 | | 0.1 | 176 |

Example 111

Analysis of Burned Surface

An X-ray diffraction pattern of the burned surface in the zirconia sintered body of the present invention was measured and a SEM picture of a rupture surface of the burned surface was taken. As the zirconia material, the partially-stabilized tetragonal zirconia powder (made by Tosoh Corporation; Product number TZ-3Y-E) including 3 mol % of yttrium oxide in the crystal particle(s) was used. The material contained 92 mass % of the partially-stabilized zirconia powder and 8 mass % of aluminum oxide, and 0.4% of phosphorus (phosphoric acid) and 0.2% of silicon dioxide were added to the total mass (weight) of the partially-stabilized zirconia powder and aluminum oxide. The mixture was burned at the temperature of 1550 degrees Celsius for 2 hours to make the zirconia sintered body.

Figure 11:
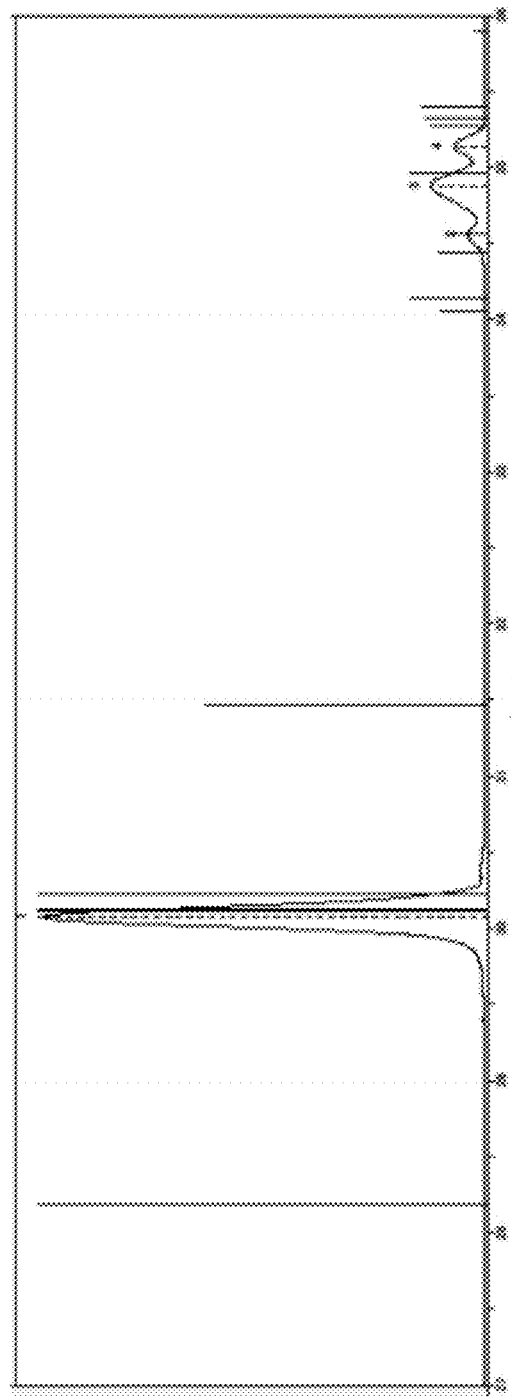
FIG. 11 is an X-ray diffraction pattern of a burned surface of a zirconia sintered body in Example 111.

The X-ray diffraction pattern of the burned surface of the made zirconia sintered body was measured with Cu-target at 50 kV and 50 mA using RINT-TTRIII (made by Rigaku Corporation). FIG. 11 shows the X-ray diffraction pattern. There are 3 peaks in a range of 34.5° to 35.3° of 2θ. The peaks on either side that locate at 34.6° and 35.2° are the [002] peak and [200] peak belonging to the tetragonal system, and the peak in the middle that locates at 34.9° is the [200] peak belonging to the cubic system. Therefore, it is found that, in the burned surface of the zirconia sintered body, a layer including the cubic crystal is formed.

Figure 12:
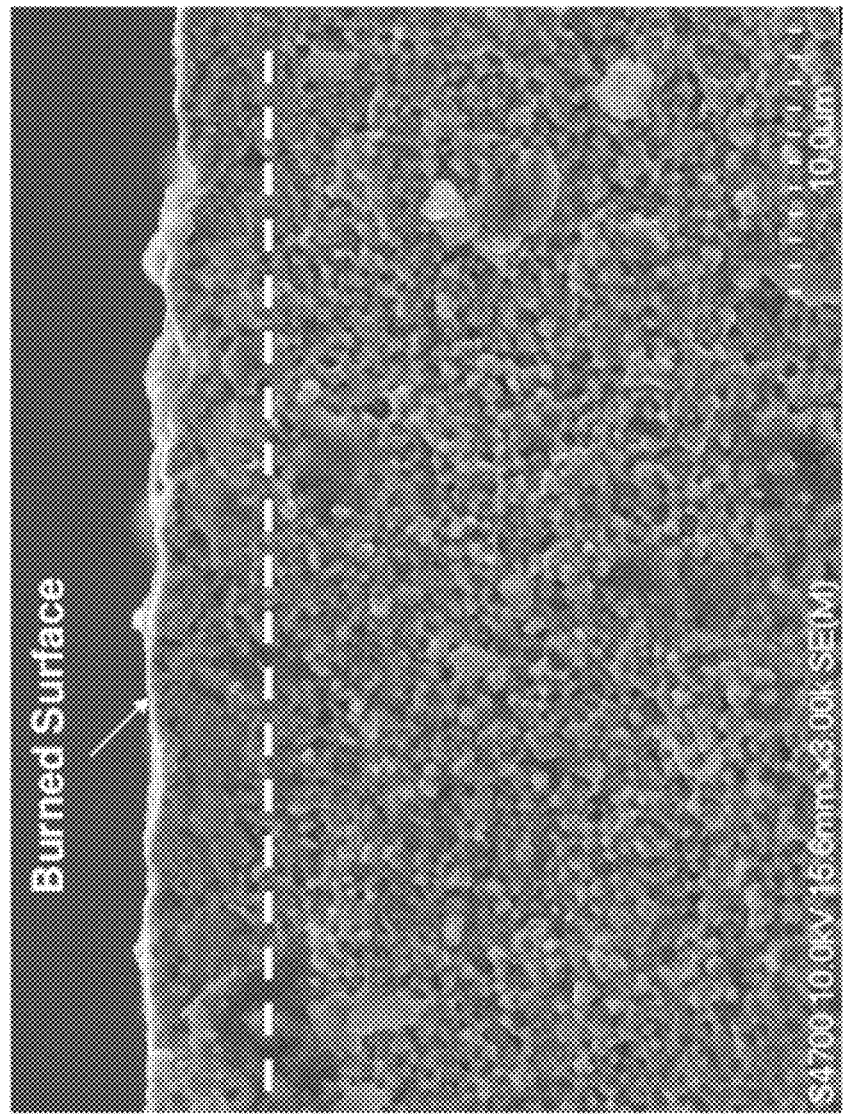
FIG. 12 is a SEM picture of a fractured section-surface of a burned (as-sintered) surface of a zirconia sintered body in Example 111.
Figure 13:
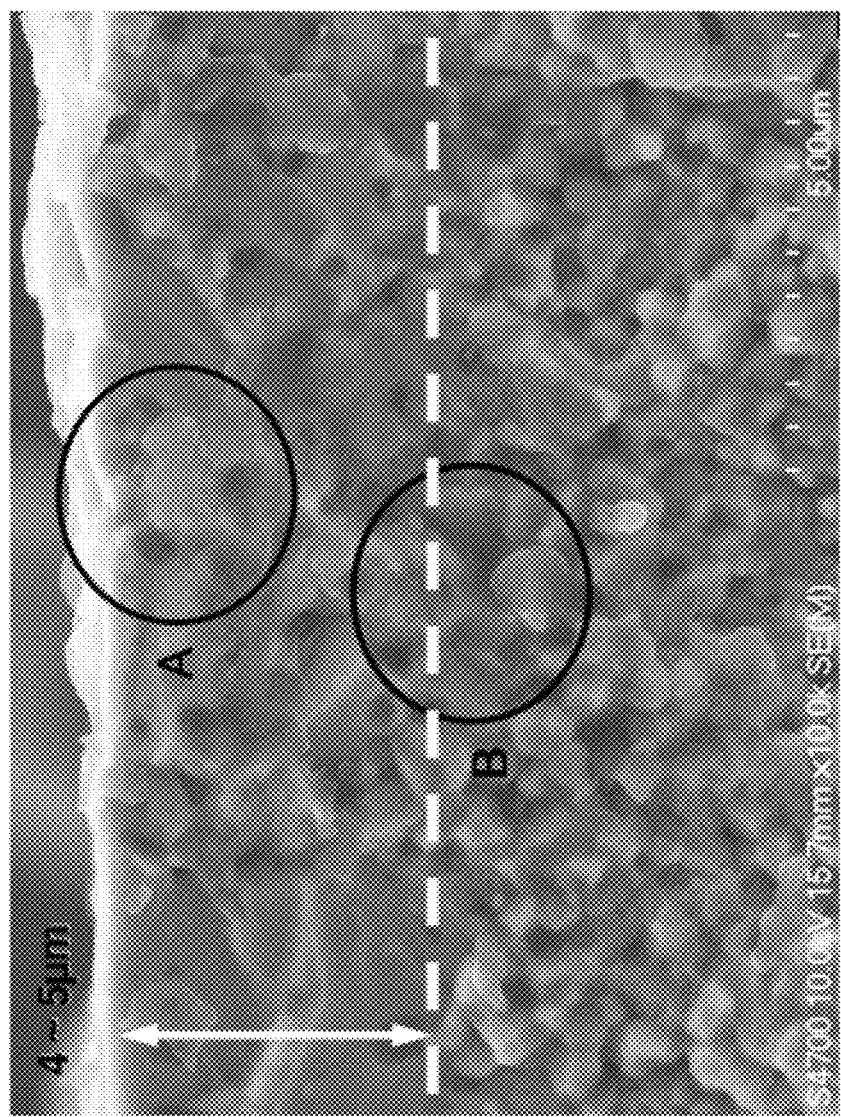
FIG. 13 is a SEM picture of a fractured section-surface of a burned surface of a zirconia sintered body in Example 111.
Figure 14:
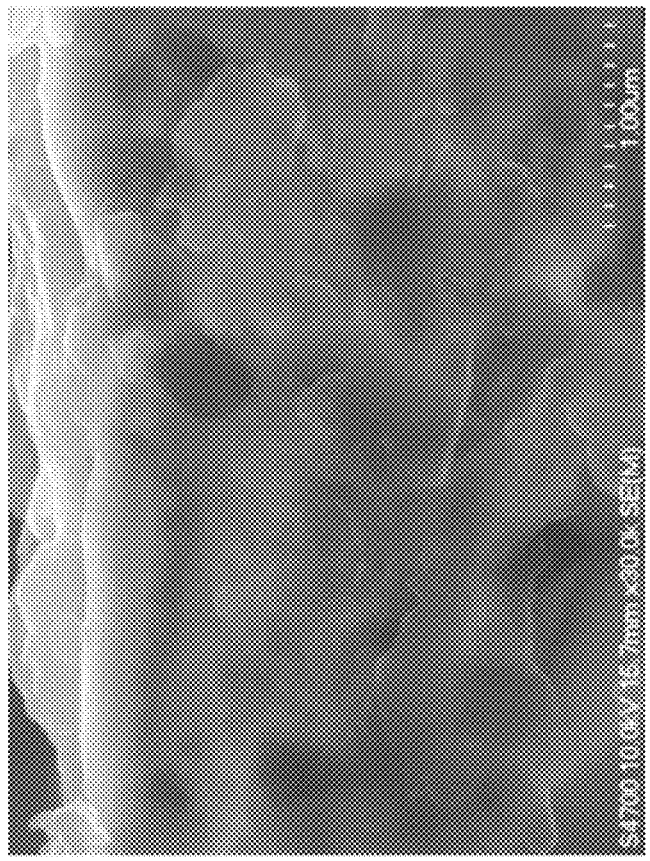
FIG. 14 is a SEM picture of a fractured section-surface of a burned surface of a zirconia sintered body in Example 111.
Figure 15:
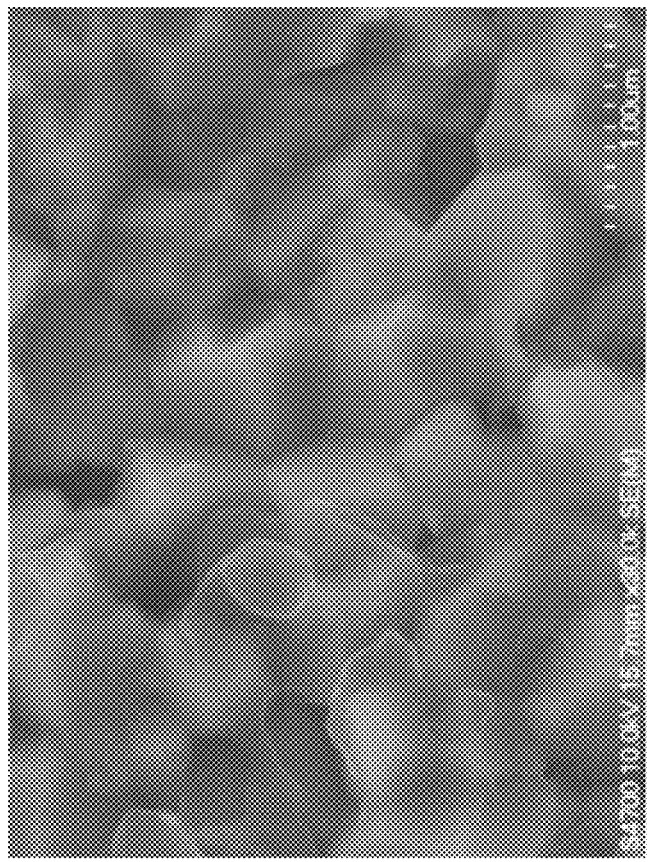
FIG. 15 is a SEM picture of a fractured section-surface of a burned surface of a zirconia sintered body in Example 111.

The sintered body was cut by bending the sintered body, and the SEM pictures of the rupture section surface were taken with a SEM (made by Hitachi, Ltd. SEMS4700). Aurum was vapor-deposited on the surface of which picture was taken. FIGS. 12 to 15 show the SEM pictures. FIG. 12 is the picture of 1,000 magnification, and FIG. 13 is the picture of 10,000 magnification. FIGS. 14 and 15 are the pictures of 30,000 magnification, FIG. 14 shows the vicinity of circle A of FIG. 13, and FIG. 15 shows the vicinity of circle B of FIG. 13. Referring to FIGS. 12 and 13, it is found that a crystal state in a region of 4 μm to 5 μm from the burned surface is different from that in a more interior region. In the region around the burned surface, the contours of the crystals vanish, and there is a state like melting. On the other hand, in the region of the interior of the sintered body, there are the clear crystal contours.

Therefore, in the zirconia sintered body of the present invention, it is considered that the crystal state in the vicinity of the burned surface changes by generation of the cubic crystals. It is considered that the thin layer including a large amount of the cubic crystals acts on the inhibition of the hydrothermal degradation.

Example 112

Measurement of X-Ray Thin Film Diffraction

X-ray thin film diffraction (thin film XRD) of the burned surface was measured, and the crystal structure in the vicinity of the burned surface was confirmed. The mixture contained 92 mass % of the partially-stabilized zirconia powder and 8 mass % of aluminum oxide (Total 100 mass %), 0.1% of phosphorus (phosphoric acid) and 0.2% of silicon dioxide were added to the total mass (weight) of the partially-stabilized zirconia powder and aluminum oxide, and a sample of the zirconia sintered body was made by burning the mixture at the temperature of 1450 degrees Celsius for 1.5 hours. The thin film XRD was measured with Cu-target at 40 kV and 200 mA using RINT-TTRIII (made by Rigaku Corporation), with an incident angle of 3° ("the incident angle" means an angle of the X-ray and the burned surface in this description). In this case, penetration depth of the X-ray is considered to be 2.6 μm. The thin film XRD can investigate a crystal structure in a region until the penetration depth of the X-ray. The sample of which the thin film XRD was measured had the same composition as the example, and was the zirconia sintered body burned at the temperature of 1450 degrees Celsius for 1.5 hours. As the comparison, the thin film XRD of the sintered body to which phosphorus was not added was measured.

In order to confirm an existence ratio of the cubic system to the penetration depth of the X-ray, the height of a peak existing around a position where a cubic [311] peak is observed at about 70.5° of 2θ and the height of a peak existing around a position where a tetragonal [211] peak is observed at about 71.0° of 2θ were measured, and the peak ratio was calculated. Table 38 shows the results. It is found that the zirconia sintered body of the present invention to which phosphorus was added had more cubic crystals in the region in the vicinity of the burned surface than the sintered body to which phosphorus was not added. That is, it is considered that the zirconia sintered body of the present invention is covered with the layer including a large amount of the cubic crystals in the burned state. It is presumed that the cover layer including a large amount of the cubic crystals improves the hydrothermal degradation-resistance.

Considering the result of the hydrothermal treatment test, the higher the burning temperature of the zirconia sintered body is, the higher the existence rate of the cubic crystals in the vicinity of the burned surface is.

TABLE 38

|  | P Addition Rate/ mass % | Peak Ratio of Burned Surface |
|---|---|---|
| Example 112 | 0.1 | 0.55 |
| Comparison 15 | 0 | 0.40 |

Examples 113-114

Composition Analyses of Burned Surface and Interior

In order to make it clear the difference between the composition of the burned surface and that of the interior, the compositions of the burned surface and inside were measured by XPS (X-ray Photoelectron Spectroscopy). Measured samples were the sintered bodies by burning the partially-stabilized zirconia including 3 mol % of $Y_2O_3$, to which phosphoric acid and silicon dioxide were added, at the temperature of 1450 degrees Celsius for 1.5 hours. Phosphoric acid was added so that, to the partially-stabilized zirconia, the content of the phosphorus element becomes 0.1 mass % in Example 112 and 0.2 mass % in Example 113. Silicon dioxide was added so as to become 0.2 mass % to the partially-stabilized zirconia. The measurement was performed with Quantera SXM (made by ULVAC-PHI, Inc.), at 90° of an extracting angle of a photoelectron from the surface of the sample (about 8 nm of detection depth). The measuring results are shown in Table 39. In Table 39, "interior" means a surface of about 500 μm of depth exposed by grinding the burned surface with #400 of diamond (grinding) wheel and then grinding #2000 of diamond paste (numerical values are based on the JIS). Values of upper rows mean contents detected as an element, and values in parentheses of lower rows mean contents converted into an oxide based on the values of the upper rows. As Comparison 16, the sintered body to which phosphorus and silicon dioxide were not added was made, and the composition analyses of the burned surface and interior were performed. Yttria and silicon dioxide were uniformly mixed in the entire compact, and the compact was not shaped in such a manner that the surface has high concentration.

When the composition of the burned surface is compared with the composition of the interior, it is found that there are more yttria and silicon dioxide in the burned surface than in the interior. It is considered that yttria in the raw material migrates to the neighborhood of the burned surface by the burning for sintering because the stabilizing agent was evenly dispersed in the entire of the compact before the sintering. It is presumed that only the burned surface is fully stabilized, that is, becomes the cubic crystal because of high content of yttria. The migration of the stabilizing agent is not observed in the sintered body of Comparison 15 not including phosphorus. Accordingly, it is considered that the addition of phosphorus contributes to the migration of the stabilizing agent to the burned surface.

It is considered, however, that, if the burning temperature of the zirconia sintered body in this example is made higher than 1450 degrees Celsius, the content of the stabilizing agent in the burned surface becomes higher because, the higher the burning temperature of the zirconia sintered body of the present invention is, the more the hydrothermal-resistance is improved.

A lower limit of detecting an element by the XPS is 1 atomic % though depending on a subject element. "No Detected" in Table 39 means to be less than the lower limit in a region from the burned surface to about 8 nm of depth, and does not mean that there is no existence of the element in the interior of the sintered body. Quantitative precision of the XPS is ±1 atomic %. The values in Table 39 were calculated after removing C atoms such as an organic compound adhered to the surface of the measurement sample. Based on a problem of the measurement precision, there is a possibility that the values in Table 39 are different from an actual composition.

TABLE 39

| | P Addition Rate/mass % | | Zr/atomic % (ZrO$_2$/mol %) | Y/atomic % (Y$_2$O$_3$/mol %) | P/atomic % (P$_2$O$_5$/mol %) | Si/atomic % (SiO$_2$/mol %) | O/ atomic % |
|---|---|---|---|---|---|---|---|
| Example 113 | 0.1 | Burned Surface | 19.8 (83.8) | 3.0 (6.3) | 1.7 (3.6) | 1.5 (6.3) | 74.0 |
| | | Interior | 29.7 (96.7) | 2.1 (3.3) | No Detected | No Detected | 68.3 |
| Example 114 | 0.2 | Burned Surface | 19.6 (84.6) | 3.3 (7.1) | 1.5 (3.3) | 1.2 (5.0) | 74.4 |
| | | Interior | 29.9 (96.9) | 1.9 (3.1) | No Detected | No Detected | 68.2 |
| Comparison 16 | 0 | Burned Surface | 30.3 (96.5) | 2.2 (3.5) | No Detected | No Detected | 67.5 |
| | | Interior | 30.3 (96.5) | 2.2 (3.5) | No Detected | No Detected | 67.5 |

Example 115

X-Ray Diffraction Measurement of Burned Surface, Interior and Re-Burned Surface

Figure 16:
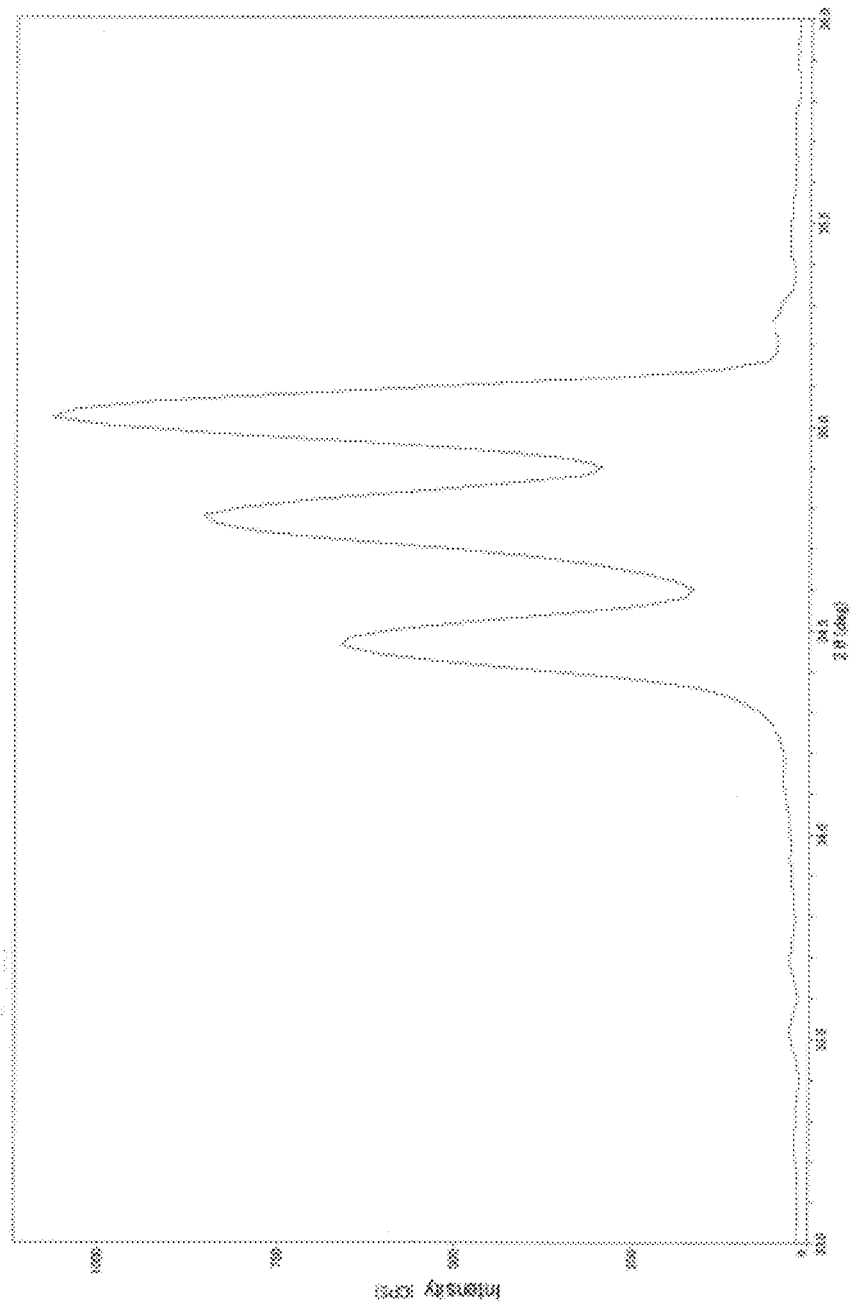
FIG. 16 is an X-ray diffraction pattern of a burned (as-sintered) surface of a zirconia sintered body of the present invention in Example 115.
Figure 17:
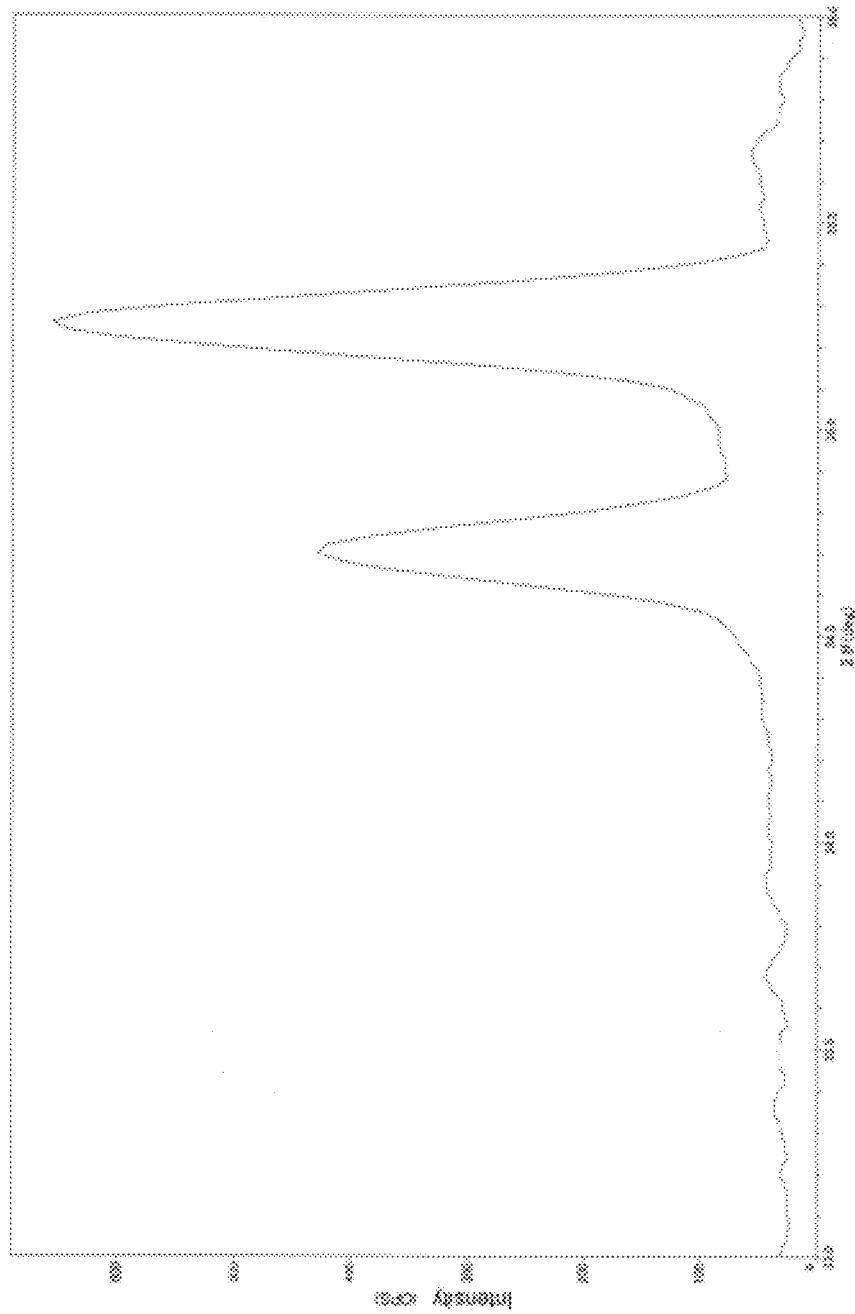
FIG. 17 is an X-ray diffraction pattern of an interior (ground surface) of a zirconia sintered body of the present invention in Example 115.
Figure 18:
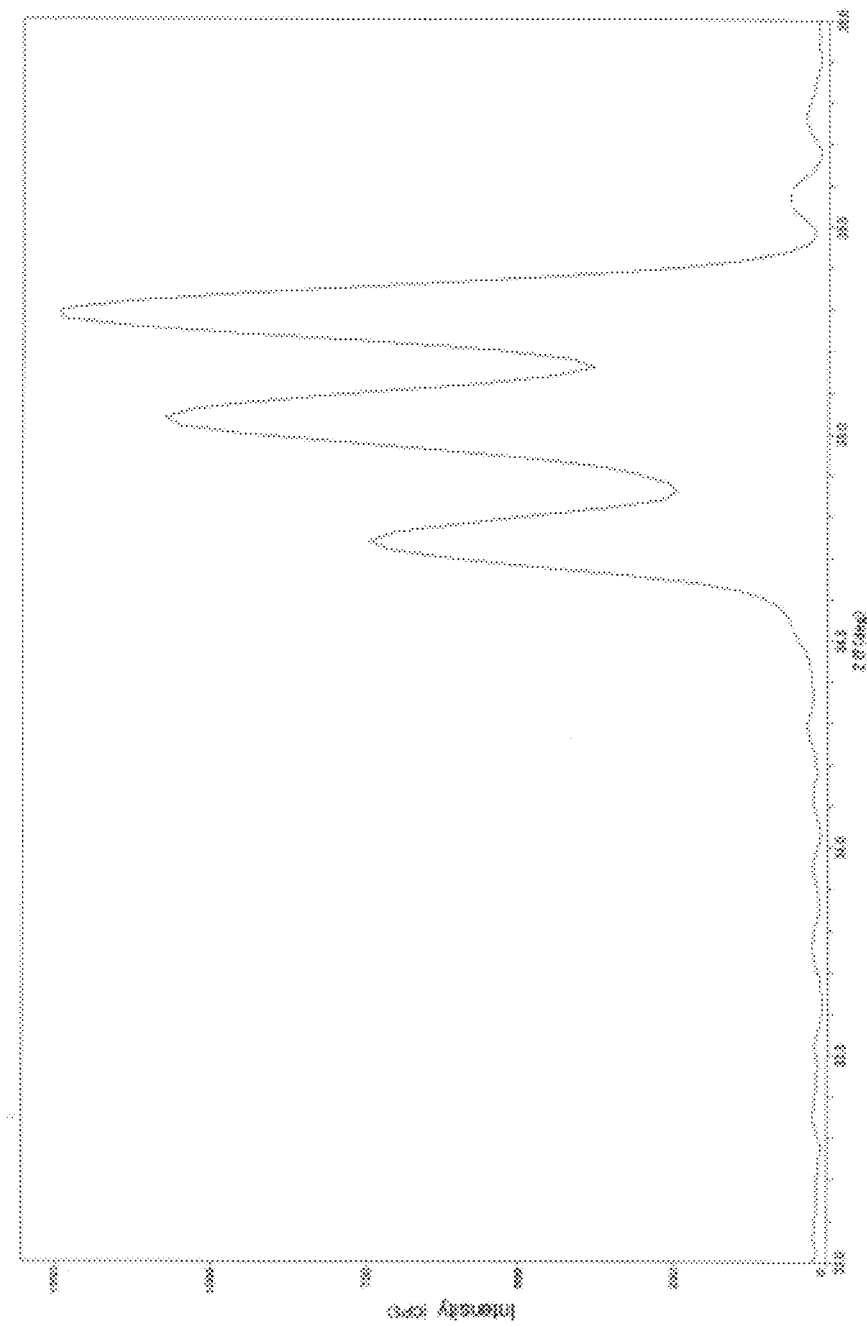
FIG. 18 is an X-ray diffraction pattern of re-burned surface of a zirconia sintered body of the present invention in Example 115.
Figure 19:
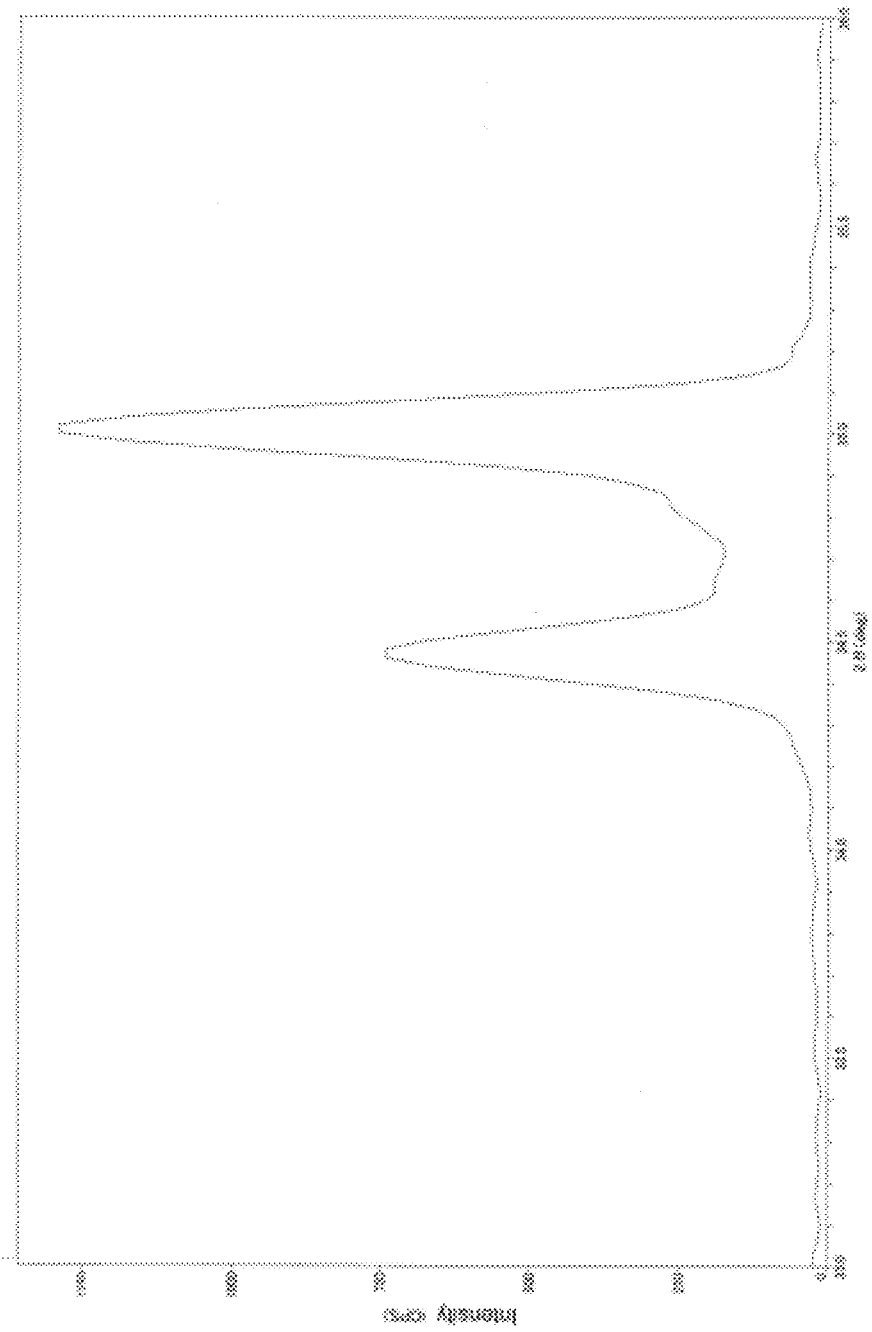
FIG. 19 is an X-ray diffraction pattern of a burned surface of a zirconia sintered body in Comparison 17.
Figure 20:
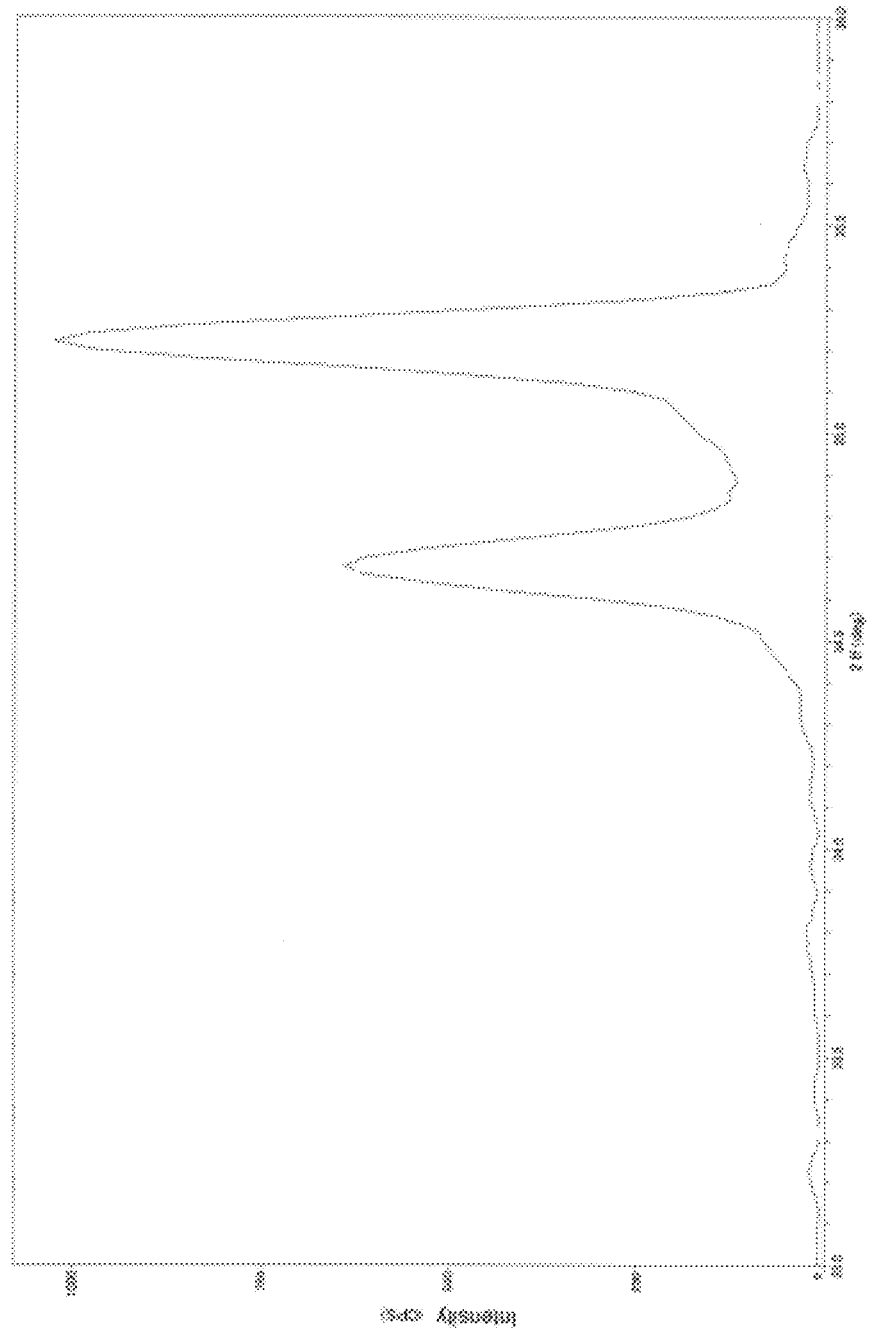
FIG. 20 is an X-ray diffraction pattern of an interior (ground surface) of a zirconia sintered body in Comparison 17.
Figure 21:
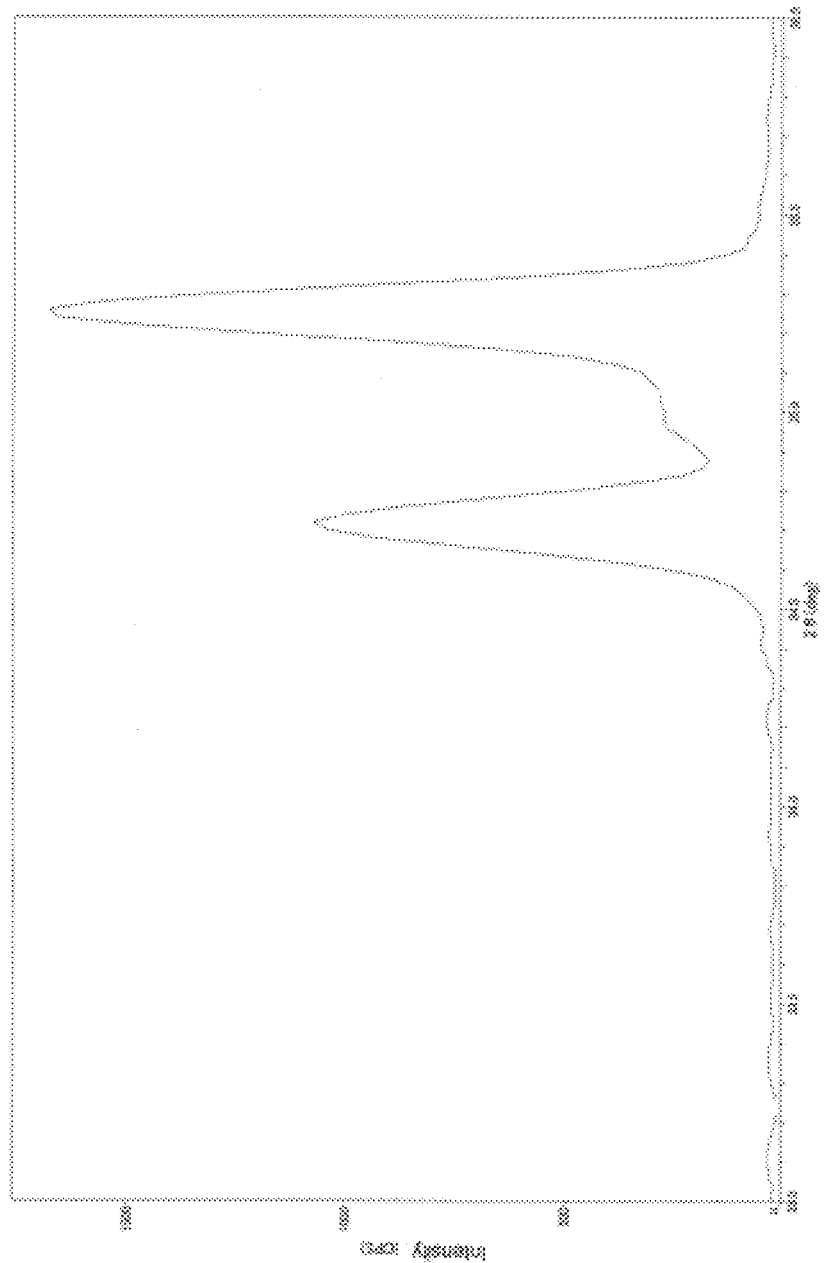
FIG. 21 is an X-ray diffraction pattern of re-burned surface of a zirconia sintered body in Comparison 17.

In order to confirm a crystal system in the interior of the sintered body, the XRD of the burned surface was measured, and a surface exposed by grinding the burned surface was also measured. The sintered body of which the burned surface was ground, that is, the sintered body in which the ground surface was exposed, was burned again, and the XRD of the re-burned surface was measured. The measurement sample was a sintered body made by burning the partially-stabilized zirconia including 3 mol % of Y$_2$O$_3$, to which phosphoric acid and silicon dioxide were added, at the temperature 1450 degree Celsius for 1.5 hours. Phosphoric acid was added so that the content of phosphorus was 0.2 mass % to the partially-stabilized zirconia, and silicon dioxide was added so as to be 0.2 mass % to the partially-stabilized zirconia. The burned surface was ground at least 100 μm or more from the burned surface by grinding the burned surface with #400 of diamond grinding wheel and then grinding it with #2000 of diamond paste. The ground sintered body was burned at the temperature of 1450 degrees Celsius for 1.5 hours again. In the time of the re-burning, any treatment of applying the stabilizing agent to the ground surface of the sintered body was not performed. The X-ray diffraction patterns were measured with Cu-target at 50 kV and 50 mA using RINT-TTRIII (made by Rigaku Corporation). As Comparison 17, the XRDs of the burned surface, ground surface and re-burned surface of the sintered body to which phosphorus is not added were also measured. FIG. 16 shows the X-ray diffraction pattern of the burned surface of the zirconia sintered body of the present invention. FIG. 17 shows the X-ray diffraction pattern of the interior (ground surface) of the zirconia sintered body of the present invention. FIG. 18 shows the X-ray diffraction pattern of the re-burned surface of the zirconia sintered body of the present invention. FIG. 19 shows the X-ray diffraction pattern of the burned surface of the zirconia sintered body of Comparison 17. FIG. 20 shows the X-ray diffraction pattern of the interior (ground surface) of the zirconia sintered body of Comparison 17. FIG. 21 shows the X-ray diffraction pattern of the re-burned surface of the zirconia sintered body of Comparison 17.

In the X-ray diffraction patterns of the zirconia sintered body to which phosphorus is not added, shown in FIGS. 19-21, there are two high peaks between about 34.5° and 35.5° of 2θ, and both of these two peaks belong to the tetragonal system. A peak of the cubic system is slightly observed between two peaks. Accordingly, it is found that, in the zirconia sintered body to which phosphorus is not added, the tetragonal system is the principle crystal system in any of the burned surface, interior and re-burned surface.

On the other hand, in the X-ray diffraction pattern of the burned surface of the zirconia sintered body of the present invention, shown in FIG. 16, three peaks were observed as same as Example 111. The left peak is a tetragonal [002] peak, the right peak is a tetragonal [200] peak, and the middle peak at 34.9° is a cubic [200] peak. It is found that the cubic crystal is formed in the burned surface of the zirconia sintered body of the present invention. In the X-ray diffraction pattern of the interior of the zirconia sintered body of the present invention, shown in FIG. 17, however, the cubic crystal was substantially not observed. Therefore, it is found that the cubic crystals are concentrated on the neighborhood (vicinity) of the burned surface.

In the X-ray diffraction pattern of the re-burned surface of the zirconia sintered body of the present invention, shown in FIG. 18, the cubic crystal was observed again. In the zirconia sintered body of the present invention, even if the burned surface is ground and a surface in which the principle crystal system is the tetragonal system is exposed, the sintered body can be covered with a layer including a large amount of the cubic crystals by re-burning it without any especial treatment, such as applying the stabilizing agent. This reason is considered to be that a phenomenon that a part of the stabilizing agent included in the compact or sintered body is migrated to the exposed surface in the time of the burning occurs by adding phosphorus.

Examples 116-117

Test on Influence that Method of Forming Partially-Stabilized Zirconia Particle has on Fracture Toughness Whether the fracture toughness was changed according to a method of forming the partially-stabilized zirconia particle was tested. Table 40 shows test conditions and results. "Solid phase method" of Example 116 means that using Y$_2$O$_3$-solid solution-ZrO$_2$ made by mixing zirconium oxide with yttrium oxide as the stabilizing agent by a solid phase method. "Liquid phase method" of Example 117 means using Y$_2$O$_3$-solid solution-ZrO$_2$ (made by Tosoh Corporation; Product Number TZ-3Y-E) formed by hydrolysis. In Examples 116 and 117, phosphoric acid was added so that the content of the phosphorus element was 0.4 mass % to the weight of the partially-stabilized zirconia. The measuring methods of the peak ratio and fracture toughness are same as the above Example. As Comparisons 18-21, the tests were also performed on the sintered body to which phosphorus was not added. In Comparison 20, silicon dioxide was substantially not added, and the value of the table indicates the standard value of the content of the commercial product.

According to the liquid phase method of Example 117 and Comparisons 19 and 20, the values of the fracture toughness were about 4 MPa·m$^{1/2}$, whereas, according to the solid phase method of Example 116 and Comparison 18, the value could be 5 MPa·m$^{1/2}$ or more. According to the liquid phase method, however, the addition of phosphorus did not change the values of the fracture toughness, whereas, according to the solid phase method, Example 116 to which phosphorus was added had the higher value of the fracture toughness than Comparison 18 to which no phosphorus was added. Therefore, it is found that a combination of the phosphorus addition and the solid phase method can enhance the value of the fracture toughness as a combined effect. It is also found that the material formed by the solid phase method is suitable for the partially-stabilized zirconia particle used in the present invention.

TABLE 40

| | Forming Method | P Addition Rate/ mass % | SiO$_2$ Addition Rate/ mass % | Peak Ratio × 100 | Value of Fracture Toughness/ MPa·m$^{1/2}$ |
|---|---|---|---|---|---|
| Example 116 | Solid Phase Method | 0.4 | 0.1 | 0 | 6.4 |
| Example 117 | Liquid Phase Method | 0.4 | 0.1 | 0 | 4.1 |
| Comparison 18 | Solid Phase Method | 0 | 0.1 | 190 | 5.4 |
| Comparison 19 | Liquid Phase Method | 0 | 0.1 | 380 | 4.0 |
| Comparison 20 | Liquid Phase Method | 0 | ≤0.02 | 372 | 4.0 |

In the above description, when the molar number of the group 15 element to 1 mol of zirconium oxide (molecular weight 123.22) is calculated, the content of zirconium oxide in the partially-stabilized zirconia powder is fixed to 94.5% (regardless of the content of silicon dioxide) giving consideration to the existence of the stabilizing agent (yttrium oxide, for example) and other compounds.

In the above description, values indicating an upper limit and lower limit in a range shown by "to" or "-" are included in that range.

Although the zirconia sintered body of the prevent invention, and the mixture (composition), compact and calcined body for the zirconia sintered body are explained based on the above embodiments and examples, the present invention is not limited to the above embodiments and examples, and may include any modification, change and improvement to the embodiments and examples based on the basic technical idea within the scope of the present invention (including each element in the claims, description and drawings). Within the scope of the present invention (including each element in the claims, description and drawings), various combinations, displacements and selections of disclosed elements are available.

A further problem, object and embodiment of the present invention become clear from the entire disclosure of the present invention including the claims, description and drawings.

INDUSTRIAL APPLICABILITY

The zirconia sintered body of the present invention can be put to various uses for dental materials such as prosthesis, connectors for optical fibers such as a ferrule and sleeve, various tools (crusher balls, cutting tools, for example), various parts (screws, bolts and nuts, for example), various sensors, elements for electronics, accessories (straps for a watch, for example), for example, based on advantages of high strength, high toughness, long durable life, high reliability, small size change, colorlessness/semi-transparency, for example.

The invention claimed is:

1. A zirconia sintered body, comprising:
   partially-stabilized zirconia as a matrix phase;
   wherein the zirconia sintered body includes phosphorus (P); and
   the phosphorus element is included $4 \times 10^{-4}$ mol to $4 \times 10^{-2}$ mol to 1 mol of zirconium oxide (IV).

2. The zirconia sintered body according to claim 1, further including 0.03 mass % to 3 mass % of silicon dioxide.

3. A zirconia sintered body,
   wherein when a low-temperature degradation acceleration test is applied to the zirconia sintered body at a temperature of 180 degrees Celsius and a pressure of 1 MPa for 24 hours,
   in an X-ray diffraction pattern of a surface of the zirconia sintered body after said low-temperature degradation acceleration test, a first peak ratio is 1 or less, the first peak ratio being a ratio of a height of a peak existing near a position where a monoclinic [11-1] peak appears to a height of a peak existing near a position where a tetragonal [111] peak appears.

4. The zirconia sintered body according to claim 1,
   wherein when a low-temperature degradation acceleration test is applied to a test piece of the zirconia sintered body having a size of 4 mm×25 mm×0.2 mm at a temperature of 180 degrees Celsius and a pressure of 1 MPa for 24 hours,
   a flexural strength of said test piece after said low-temperature degradation acceleration test is 50 MPa or more, the flexural strength being measured in conformity with JISR1601 except the size of said test piece.

5. The zirconia sintered body according to claim 1,
   wherein, in an X-ray diffraction pattern of a burned (as-sintered) surface, a second peak ratio is 0.4 or more, the second peak ratio being a ratio of a height of a peak existing near a position where a cubic [200] peak appears to a height of a peak existing near a position where a tetragonal [200] peak appears; and
   in an X-ray diffraction pattern of a region having depth of 100 μm or more from the burned surface, a third peak ratio is 0.3 or less, the third peak ratio being the ratio of the height of the peak existing near the position where the cubic [200] peak appears to the height of the peak existing near the position where the tetragonal [200] peak appears.

6. The zirconia sintered body according to claim 1, wherein when a burned (as-sintered) surface or exposed surface is ground so that a surface, in which a fourth peak ratio is 0.3 or less, is exposed and then burned again, the fourth peak ratio being a ratio of a height of a peak existing near a position where a cubic [200] peak appears to a height of a peak existing near a position where a tetragonal [200] peak appears,
   in an X-ray diffraction pattern of a re-burned surface, a fifth peak ratio is 0.4 or more, the fifth peak ratio being the ratio of the height of the peak existing near the position where the cubic [200] peak appears to the height of the peak existing near the position where the tetragonal [200] peak appears.

7. The zirconia sintered body according to claim 6,
   wherein, in an X-ray diffraction pattern of a region having depth of 100 μm or more from the re-burned surface, a sixth peak ratio is 0.3 or less, the sixth peak ratio being the ratio of the height of the peak existing near the position where the cubic [200] peak appears to the height of the peak existing near the position where the tetragonal [200] peak appears.

8. A precursor compact for sintering a zirconia sintered body, comprising:
partially-stabilized zirconia particles; and
an added compound(s) including a phosphorus (P) element or an added simple substance of said element;
wherein the phosphorus element is included $4\times10^{-4}$ mol to $4\times10^{-2}$ mol to 1 mol of zirconium oxide (IV).

9. The compact according to claim 8,
wherein said compound(s) is(are) phosphoric acid or phosphate.

10. The compact according to claim 8,
wherein said compound(s) is(are) an organic compound including phosphorus.

11. The compact according to claim 8, further comprising 0.03 mass % to 3 mass % of silicon dioxide to said partially-stabilized zirconia particles.

12. A compact as a precursor for sintering a zirconia sintered body,
wherein the zirconia sintered body according to claim 1 is obtained by sintering the compact at a temperature ranging from 1450 degrees Celsius to 1650 degrees Celsius.

13. A calcined body as a precursor for sintering a zirconia sintered body, made by calcining the compact according to claim 8 at a temperature ranging from 800 degrees Celsius to 1200 degrees Celsius.

14. A calcined body as a precursor for sintering a zirconia sintered body,
wherein the zirconia sintered body according to claim 1 is obtained by sintering the calcined body at a temperature ranging from 1450 degrees Celsius to 1650 degrees Celsius.

15. A mixture for sintering a zirconia sintered body, comprising:
partially-stabilized zirconia particles; and
an added compound(s) including a phosphorus (P) element or an added simple substance of said element;
wherein the phosphorus element is included $4\times10^{-4}$ mol to $4\times10^{-2}$ mol to 1 mol of zirconium oxide (IV).

16. The mixture according to claim 15, further comprising 0.03 mass % to 3 mass % of silicon dioxide to said partially-stabilized zirconia particles.

17. A mixture for sintering a zirconia sintered body,
wherein the zirconia sintered body according to claim 1 is obtained by sintering the mixture at a temperature ranging from 1450 degrees Celsius to 1650 degrees Celsius.

18. A compact as a precursor for sintering a zirconia sintered body,
wherein the zirconia sintered body according to claim 3 is obtained by sintering the compact at a temperature ranging from 1450 degrees Celsius to 1650 degrees Celsius.

19. A calcined body as a precursor for sintering a zirconia sintered body,
wherein the zirconia sintered body according to claim 3 is obtained by sintering the calcined body at a temperature ranging from 1450 degrees Celsius to 1650 degrees Celsius.

20. A mixture for sintering a zirconia sintered body,
wherein the zirconia sintered body according to claim 3 is obtained by sintering the mixture at a temperature ranging from 1450 degrees Celsius to 1650 degrees Celsius.

* * * * *